(12) United States Patent
Bateman et al.

(10) Patent No.: US 7,793,937 B2
(45) Date of Patent: *Sep. 14, 2010

(54) BULLET TRAP

(75) Inventors: Kyle Bateman, Provo, UT (US); Thomas Marshall, Lakeshore, UT (US); David Bassett, Provo, UT (US)

(73) Assignee: Action Target Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/250,388

(22) Filed: Oct. 13, 2008

(65) Prior Publication Data

US 2009/0096173 A1     Apr. 16, 2009

Related U.S. Application Data

(63) Continuation of application No. 11/494,788, filed on Jul. 26, 2006, which is a continuation-in-part of application No. 10/317,025, filed on Dec. 11, 2002, now Pat. No. 7,194,944.

(60) Provisional application No. 60/340,201, filed on Dec. 12, 2001.

(51) Int. Cl.
    *F41J 13/00*    (2009.01)
(52) U.S. Cl. ...................................... 273/410
(58) Field of Classification Search ................ 273/403, 273/404, 407, 408, 410
    See application file for complete search history.

(56) References Cited

U.S. PATENT DOCUMENTS

| | | | |
|---|---|---|---|
| 197,398 A | 11/1877 | O'Neil |
| 385,546 A | 7/1888 | Decumbus |
| 429,942 A | 6/1890 | McBride |
| 631,175 A | 8/1899 | Parnall |
| 694,581 A | 3/1902 | Reichlin |
| 774,959 A | 11/1904 | Tresidder |
| 840,610 A | 1/1907 | Easdale |
| 867,406 A | 10/1907 | Pates |
| 941,642 A | 11/1909 | Maxim |
| 960,085 A | 5/1910 | Giles |
| 980,255 A | 1/1911 | Herms et al. |
| 1,035,908 A | 8/1912 | Richardson |

(Continued)

FOREIGN PATENT DOCUMENTS

AU          127432          4/1946

(Continued)

OTHER PUBLICATIONS

Product Literature, Caswell International Corp., Copyright 2002.

(Continued)

*Primary Examiner*—Mark S Graham
(74) *Attorney, Agent, or Firm*—Bateman IP Law Group

(57) ABSTRACT

A bullet trap is disclosed which is formed without intervening sidewalls to enable cross-shooting and the like with reduced risk or ricochet or damage to the bullet trap. Furthermore, the bullet trap can be configured in a variety of ways to eliminate the need for facing plates while providing a removable attachment mechanism, to enable repair on the trap, to reduce bullet adhesion to the trap and to provide improved containment of lead and improved access to the trap.

62 Claims, 19 Drawing Sheets

U.S. PATENT DOCUMENTS

| | | |
|---|---|---|
| 1,155,717 A | 10/1915 | Fouts |
| 1,199,357 A | 9/1916 | Evans, Jr. |
| 1,207,456 A | 12/1916 | Whelan |
| 1,348,283 A | 8/1920 | Koehl |
| 1,543,605 A | 6/1925 | Gavard |
| 1,559,171 A | 10/1925 | Knowles |
| 1,724,601 A | 8/1929 | Kellogg |
| 1,738,874 A | 12/1929 | Domingo |
| 1,803,514 A | 5/1931 | Thomas |
| 1,957,933 A | 5/1934 | Brandl |
| 2,008,359 A | 7/1935 | Lamb |
| 2,013,133 A | 9/1935 | Caswell |
| 2,039,552 A | 5/1936 | Reynolds |
| 2,054,665 A | 9/1936 | Tracy |
| 2,085,933 A | 7/1937 | Vaughan |
| 2,104,171 A | 1/1938 | Schwerin |
| 2,105,784 A | 1/1938 | Hagberg |
| 2,170,637 A | 8/1939 | Hatch et al. |
| 2,179,471 A | 11/1939 | Lee |
| 2,201,527 A | 5/1940 | Freeman |
| 2,208,010 A | 7/1940 | Whitmore |
| 2,209,580 A | 7/1940 | Sargent |
| 2,212,982 A | 8/1940 | Drain, Jr. et al. |
| 2,231,528 A | 2/1941 | Daniels |
| 2,269,490 A | 1/1942 | Slick |
| 2,284,510 A | 5/1942 | Cates |
| 2,350,827 A | 6/1944 | Saulnier |
| 2,372,111 A | 3/1945 | Norberg |
| 2,410,922 A | 11/1946 | Balduf |
| 2,411,026 A | 11/1946 | Conner et al. |
| 2,412,242 A | 12/1946 | Beaud |
| 2,420,304 A | 5/1947 | Diem |
| 2,518,445 A | 8/1950 | Benson |
| 2,587,042 A | 2/1952 | Haiselup |
| 2,591,984 A | 4/1952 | Walsh |
| 2,613,934 A | 10/1952 | Tabler |
| 2,628,388 A | 2/1953 | Poth |
| 2,631,454 A | 3/1953 | Shepard et al. |
| 2,670,959 A | 3/1954 | Broyles |
| 2,706,634 A | 4/1955 | Van Valkenburg |
| 2,713,262 A | 7/1955 | Webster |
| 2,772,092 A | 11/1956 | Nikoden |
| 2,819,903 A | 1/1958 | Saunders |
| 2,855,871 A | 10/1958 | Huntington |
| 2,905,469 A | 9/1959 | Taylor |
| 2,927,665 A | 3/1960 | Hauf |
| 2,932,860 A | 4/1960 | Barth |
| 3,014,725 A | 12/1961 | Lewis |
| 3,032,808 A | 5/1962 | Fleming |
| 3,087,701 A | 4/1963 | Wallace |
| 3,103,362 A | 9/1963 | Elofson |
| 3,113,773 A | 12/1963 | Ripepe |
| 3,348,843 A | 10/1967 | Stanley |
| 3,392,980 A | 7/1968 | Ortega |
| 3,404,887 A | 10/1968 | Dundr |
| 3,423,891 A | 1/1969 | Burris |
| 3,447,806 A | 6/1969 | Pfaff et al. |
| 3,485,405 A | 12/1969 | Dement |
| 3,508,302 A | 4/1970 | Settanni |
| 3,515,388 A | 6/1970 | Zachmeier |
| 3,530,633 A | 9/1970 | Scott |
| 3,567,223 A | 3/1971 | Gentiluomo |
| 3,673,294 A | 6/1972 | Matthaei |
| 3,701,532 A | 10/1972 | Nikoden |
| 3,715,843 A | 2/1973 | Ballinger |
| 3,722,182 A | 3/1973 | Gilbertson |
| 3,737,165 A | 6/1973 | Pencyla |
| 3,802,098 A | 4/1974 | Sampson et al. |
| 3,914,879 A | 10/1975 | Taylor, III |
| 3,927,500 A | 12/1975 | Plumlee |
| 3,969,855 A | 7/1976 | Lendi |
| 3,982,761 A | 9/1976 | DeVogelaere |
| 3,988,131 A | 10/1976 | Kanazawa et al. |
| 3,992,007 A | 11/1976 | Seeman |
| 4,028,856 A | 6/1977 | Dalbec |
| 4,084,299 A | 4/1978 | Noda |
| 4,086,711 A | 5/1978 | Gammarino et al. |
| 4,114,521 A | 9/1978 | Busch |
| 4,126,311 A | 11/1978 | Wagoner |
| 4,164,901 A | 8/1979 | Everett |
| 4,177,835 A | 12/1979 | Paley |
| 4,205,847 A | 6/1980 | Steiger et al. |
| 4,228,569 A | 10/1980 | Snyder |
| 4,232,867 A | 11/1980 | Tate, Sr. |
| 4,254,600 A | 3/1981 | Zwissler |
| 4,272,078 A | 6/1981 | Vinette |
| 4,288,080 A | 9/1981 | Laporte et al. |
| 4,293,320 A | 10/1981 | Robinson |
| 4,294,452 A | 10/1981 | Schlotter et al. |
| 4,317,572 A | 3/1982 | Iseli |
| 4,340,370 A | 7/1982 | Marshall et al. |
| 4,361,330 A | 11/1982 | Scharer |
| 4,395,045 A | 7/1983 | Baer |
| 4,440,399 A | 4/1984 | Smith |
| 4,445,693 A | 5/1984 | Angwin |
| 4,458,901 A | 7/1984 | Wojcinski |
| 4,506,416 A | 3/1985 | Ohminato et al. |
| 4,509,301 A | 4/1985 | Head |
| 4,512,585 A | 4/1985 | Baravaglio |
| 4,540,182 A | 9/1985 | Clement |
| 4,546,984 A | 10/1985 | Towle et al. |
| 4,598,631 A | 7/1986 | Everett |
| 4,614,345 A | 9/1986 | Doughty |
| 4,657,261 A | 4/1987 | Saunders |
| 4,677,798 A | 7/1987 | Phillips |
| 4,683,688 A | 8/1987 | Wojcinski |
| 4,691,925 A | 9/1987 | Scholem |
| 4,723,749 A | 2/1988 | Carraro et al. |
| 4,726,593 A | 2/1988 | Wade |
| 4,728,109 A | 3/1988 | Simonetti |
| 4,739,996 A | 4/1988 | Vedder |
| 4,743,032 A | 5/1988 | Summers et al. |
| 4,744,910 A | 5/1988 | Bossard |
| 4,786,059 A | 11/1988 | Barini |
| 4,787,289 A | 11/1988 | Duer |
| 4,819,946 A | 4/1989 | Kahler |
| 4,821,620 A | 4/1989 | Cartee et al. |
| 4,844,476 A | 7/1989 | Becker |
| 4,846,043 A | 7/1989 | Langsam |
| 4,856,791 A | 8/1989 | McQuade |
| 4,898,391 A | 2/1990 | Kelly et al. |
| 4,911,453 A | 3/1990 | Essex et al. |
| 4,913,389 A | 4/1990 | McCracken |
| 4,919,437 A | 4/1990 | Salabe et al. |
| 5,006,995 A | 4/1991 | Toschi et al. |
| 5,040,802 A | 8/1991 | Wojcinski et al. |
| 5,050,363 A | 9/1991 | Fornell |
| 5,054,723 A | 10/1991 | Arnold |
| 5,064,457 A | 11/1991 | Weber |
| 5,070,763 A | 12/1991 | Coburn |
| 5,085,765 A | 2/1992 | Salabé et al. |
| 5,088,741 A | 2/1992 | Simonetti |
| 5,113,700 A | 5/1992 | Coburn |
| 5,121,671 A | 6/1992 | Coburn |
| 5,127,340 A | 7/1992 | Maro et al. |
| D329,680 S | 9/1992 | Burn |
| 5,145,133 A | 9/1992 | France |
| 5,163,689 A | 11/1992 | Bateman et al. |
| 5,171,020 A | 12/1992 | Wojcinski |
| 5,213,336 A | 5/1993 | Bateman |
| 5,232,227 A | 8/1993 | Bateman |
| 5,240,258 A | 8/1993 | Bateman |
| 5,242,172 A | 9/1993 | Bateman |
| 5,242,245 A | 9/1993 | Schellstede |

| | | | | | | |
|---|---|---|---|---|---|---|
| 5,255,924 | A | 10/1993 | Copius | 6,245,822 | B1 | 6/2001 | Terada et al. |
| 5,259,291 | A | 11/1993 | Wilson | 6,268,590 | B1 | 7/2001 | Gale et al. |
| 5,263,721 | A | 11/1993 | Lowrance | 6,283,756 | B1 | 9/2001 | Danckwerth et al. |
| 5,277,432 | A | 1/1994 | Bateman | 6,286,269 | B1 | 9/2001 | Marcum |
| 5,316,479 | A | 5/1994 | Wong et al. | 6,289,213 | B1 | 9/2001 | Flint et al. |
| 5,322,533 | A | 6/1994 | Todorovic | 6,293,552 | B1 | 9/2001 | Wojcinski et al. |
| 5,324,043 | A | 6/1994 | Estrella | 6,308,062 | B1 | 10/2001 | Chien et al. |
| 5,340,117 | A | 8/1994 | Wojcinski | 6,311,980 | B1 | 11/2001 | Sovine et al. |
| 5,346,226 | A | 9/1994 | Block | 6,322,444 | B1 | 11/2001 | Matsui et al. |
| 5,350,180 | A | 9/1994 | Acock | 6,325,376 | B1 | 12/2001 | Elliott et al. |
| 5,352,170 | A | 10/1994 | Condo et al. | 6,328,651 | B1 | 12/2001 | Lebensfeld et al. |
| 5,361,455 | A | 11/1994 | Kiefer | 6,332,243 | B1 | 12/2001 | Kim |
| 5,400,692 | A | 3/1995 | Bateman et al. | 6,363,687 | B1 | 4/2002 | Luciano et al. |
| 5,405,673 | A | 4/1995 | Seibert | 6,363,867 | B1 | 4/2002 | Tsilevich |
| 5,423,150 | A | 6/1995 | Hitchcock | 6,378,870 | B1 | 4/2002 | Sovine et al. |
| 5,433,451 | A | 7/1995 | De Vries | 6,398,215 | B1 | 6/2002 | Carroll |
| 5,433,763 | A | 7/1995 | Shagott et al. | 6,413,476 | B1 | 7/2002 | Barnhart |
| 5,435,571 | A | 7/1995 | Wojcinski et al. | 6,415,557 | B1 | 7/2002 | McCalley |
| 5,441,280 | A | 8/1995 | Copius | 6,438,906 | B1 | 8/2002 | Komarowski et al. |
| 5,456,155 | A | 10/1995 | Myrtoglou | 6,453,621 | B1 | 9/2002 | Bundy, Jr. et al. |
| 5,486,008 | A | 1/1996 | Coburn | 6,463,299 | B1 | 10/2002 | Macor |
| 5,535,662 | A | 7/1996 | Bateman et al. | 6,478,301 | B1 | 11/2002 | Witmeyer |
| 5,542,616 | A | 8/1996 | Archer | 6,484,990 | B1 | 11/2002 | Marshall et al. |
| 5,564,712 | A | 10/1996 | Werner | 6,502,820 | B2 | 1/2003 | Slifko |
| 5,579,794 | A | 12/1996 | Sporta | 6,533,280 | B1 | 3/2003 | Sovine et al. |
| 5,592,789 | A | 1/1997 | Liddell, Sr. et al. | 6,543,778 | B2 | 4/2003 | Baker |
| 5,598,996 | A | 2/1997 | Rath | 6,575,753 | B2 | 6/2003 | Rosa et al. |
| 5,600,084 | A | 2/1997 | Gonzalez | 6,588,759 | B1 | 7/2003 | Bateman |
| 5,607,163 | A | 3/1997 | Nesler | 6,679,795 | B2 | 1/2004 | Ouimette et al. |
| 5,618,044 | A | 4/1997 | Bateman | 6,718,596 | B2 | 4/2004 | Kohlstrand et al. |
| 5,621,950 | A | 4/1997 | White | 6,728,546 | B1 | 4/2004 | Peterson et al. |
| 5,636,995 | A | 6/1997 | Sharpe, III et al. | 6,730,167 | B2 | 5/2004 | Shutic et al. |
| 5,641,288 | A | 6/1997 | Zaenglein, Jr. | RE38,540 | E | 6/2004 | Bateman |
| 5,648,794 | A | 7/1997 | Jelsma et al. | 6,746,325 | B2 | 6/2004 | Crane |
| 5,649,706 | A | 7/1997 | Treat, Jr. et al. | 6,776,418 | B1 | 8/2004 | Sovine et al. |
| 5,655,775 | A | 8/1997 | Pontus et al. | 6,808,177 | B2 | 10/2004 | Dehart |
| 5,663,520 | A | 9/1997 | Ladika et al. | 6,808,178 | B1 | 10/2004 | Sovine et al. |
| 5,670,734 | A | 9/1997 | Middione et al. | 6,845,701 | B2 | 1/2005 | Drackett |
| 5,676,378 | A | 10/1997 | West | 6,865,852 | B2 | 3/2005 | Gower |
| 5,715,739 | A | 2/1998 | White | 6,896,267 | B1 | 5/2005 | Le Anna |
| 5,738,593 | A | 4/1998 | Coury et al. | 6,975,859 | B1 | 12/2005 | Lambert et al. |
| 5,748,072 | A | 5/1998 | Wang | 6,994,348 | B2 | 2/2006 | Lambert et al. |
| 5,749,671 | A | 5/1998 | Chauquet | 6,994,349 | B2 | 2/2006 | Lambert et al. |
| 5,765,832 | A | 6/1998 | Huff | 7,117,645 | B2 | 10/2006 | Bzorgi |
| 5,779,068 | A | 7/1998 | Whiten et al. | 7,134,977 | B2 | 11/2006 | Campbell et al. |
| 5,791,090 | A | 8/1998 | Gitlin et al. | 7,140,615 | B1 | 11/2006 | Sovine et al. |
| 5,802,460 | A | 9/1998 | Parvulescu et al. | 7,175,181 | B1 | 2/2007 | Bateman et al. |
| 5,811,164 | A | 9/1998 | Mitchell | 7,194,944 | B2 | 3/2007 | Lambert et al. |
| 5,811,718 | A | 9/1998 | Bateman et al. | 7,219,897 | B2 | 5/2007 | Sovine et al. |
| 5,822,936 | A | 10/1998 | Bateman et al. | 7,234,890 | B1 | 6/2007 | Marshall et al. |
| 5,829,753 | A | 11/1998 | Wiser | 7,264,246 | B2 | 9/2007 | Sovine et al. |
| 5,848,794 | A | 12/1998 | Wojcinski et al. | 7,275,748 | B2 | 10/2007 | Lambert et al. |
| 5,860,251 | A | 1/1999 | Gleich | 7,303,192 | B2 | 12/2007 | Marshall et al. |
| 5,901,960 | A | 5/1999 | Nesler et al. | 7,306,230 | B2 | 12/2007 | Lambert et al. |
| 5,906,552 | A | 5/1999 | Padilla | 7,322,771 | B1 | 1/2008 | Marshall et al. |
| 5,915,449 | A | 6/1999 | Schwartz | 2005/0022658 | A1 | 2/2005 | Bateman |
| 5,934,678 | A | 8/1999 | Theissen et al. | 2006/0208425 | A1 | 9/2006 | Lambert et al. |
| 5,947,477 | A | 9/1999 | Turnipseed | 2006/0220319 | A1 | 10/2006 | Lambert et al. |
| 5,950,283 | A | 9/1999 | Sato | 2006/0234069 | A1 | 10/2006 | Sovine et al. |
| 5,951,016 | A | 9/1999 | Bateman | 2006/0240388 | A1 | 10/2006 | Marshall et al. |
| 5,963,624 | A | 10/1999 | Pope | 2006/0240391 | A1 | 10/2006 | Sovine et al. |
| 5,967,523 | A | 10/1999 | Brownlee | 2007/0040334 | A1 | 2/2007 | Marshall et al. |
| 5,988,645 | A | 11/1999 | Downing | 2007/0045965 | A1 | 3/2007 | Bateman et al. |
| 6,000,700 | A | 12/1999 | Nesler et al. | 2007/0069472 | A1 | 3/2007 | Lambert et al. |
| 6,016,735 | A | 1/2000 | Langner | 2007/0072537 | A1 | 3/2007 | Bateman et al. |
| 6,018,847 | A | 2/2000 | Lu | 2007/0102883 | A1 | 5/2007 | Parks et al. |
| 6,027,120 | A | 2/2000 | Wojcinski et al. | 2007/0114724 | A1 | 5/2007 | Bassett et al. |
| 6,067,953 | A | 5/2000 | Bloomer | 2007/0235943 | A1 | 10/2007 | Bateman et al. |
| 6,109,614 | A | 8/2000 | Ciarcia | 2008/0022847 | A1 | 1/2008 | Bateman et al. |
| 6,162,057 | A | 12/2000 | Westphal et al. | | | | |
| 6,173,956 | B1 | 1/2001 | O'Neal | | | | |
| 6,223,029 | B1 | 4/2001 | Stenman et al. | | | | |
| 6,230,214 | B1 | 5/2001 | Liukkonen et al. | AU | | 202340 | 8/1954 |

FOREIGN PATENT DOCUMENTS

| | | |
|---|---|---|
| DE | 227342 | 10/1910 |
| DE | 498308 | 5/1930 |
| DE | 514123 | 11/1930 |
| DE | 877489 | 5/1953 |
| DE | 2021170 | 11/1971 |
| DE | 597451 A5 | 4/1978 |
| DE | 214 433 | 10/1984 |
| DE | 3635741 A1 | 7/1992 |
| EP | 0 523 801 | 1/1993 |
| FR | 832754 | 10/1938 |
| FR | 849 829 | 12/1939 |
| FR | 1156211 | 5/1958 |
| FR | 2461069 | 7/1980 |
| GB | 6353 | 1/1909 |
| GB | 725189 | 3/1955 |
| GE | 280832 | 11/1927 |
| NL | 7700295 | 7/1978 |
| WO | WO 94/27111 | 11/1994 |

OTHER PUBLICATIONS

Porta Target Shoot House circa 1997.
Super Trap Bullet Containment Systems, circa 1998.
1995 Guide to Affordable Target Technology, Duel Atron, Target Systems.
United Steel Sash, Tussed Concrete Steel Co., Youngstown, Ohio, Copyright 1903, p. 23.
Savage Arms, Shoot House Bid and Specification, Bid dated Oct. 1998.
Declaration of Kyle Bateman.
Exhibit A: cross sectional view of a bullet trap designed and manufactured by Action Target.
U.S. Appl. No. 10/287,191, filed Nov. 4, 2002, Bateman et al.
U.S. Appl. No. 11/349,739, filed Feb. 8, 2006, Bateman et al.
U.S. Appl. No. 11/349,738, filed Feb. 8, 2006, Bateman et al.
U.S. Appl. No. 11/494,788, filed Jul. 26, 2006, Bateman et al.
U.S. Appl. No. 11/506,413, filed Aug. 17, 2006, Wright et al.
U.S. Appl. No. 11/506,763, filed Aug. 18, 2006, Sovine et al.
U.S. Appl. No. 11/530,280, filed Sep. 8, 2006, Marshall et al.
U.S. Appl. No. 11/745,077, May 7, 2007, Bassett et al.
U.S. Appl. No. 11/781,187, filed Jul. 20, 2007, Bateman et al.

BULLET TRAP

RELATED APPLICATIONS

The present application is a continuation of U.S. patent application Ser. No. 11/494,788, filed on Jul. 26, 2006, which is a continuation-in-part of U.S. patent application Ser. No. 10/317,025, filed Dec. 11, 2002, now U.S. Pat. No. 7,194,944 which are incorporated herein by reference in their entirety, and which claims the benefit of U.S. Provisional Patent Application No. 60/340,201, filed Dec. 12, 2001, which is incorporated herein by reference.

BACKGROUND OF THE INVENTION

1. Field of the Invention

The present invention relates to a bullet trap for receiving projectiles fired at the bullet trap and for containing the projectiles. More particularly, the present invention relates to a system which allows cross-firing of bullets with much less risk of ricochets and damage to the trap, and to a system which allows bullet traps to be constructed less expensively and repaired more easily.

2. State of the Art

In order to maintain their proficiency with various types of firearms, law enforcement officers and others routinely engage in target practice. For many years, target practice was conducted in environments in which there was little concern for recovering the bullets. Firing ranges commonly used a large mound of dirt to decelerate the bullet after it had passed through the target. Such a system was generally safe, in that the dirt was effective in stopping the bullet and preventing injuries. (While the most common projectile at a firing range is a bullet, other projectiles, such as shot, can also be present. Thus, as used herein, projectiles includes bullets and vice versa.)

More recently, considerable concern has been raised about the lead contained in the bullet. Though the bullet fired into the mound of dirt was safely contained from the point of being a moving projectile with a significant amount of inertial momentum, the lead in the bullet was free to escape into the environment. For example, when a mound containing a number of bullets became wet, lead could leach into surrounding soil and even the groundwater. When a range was used frequently, a considerable amount of lead could be released into the environment, thereby injuring wildlife and contaminating groundwater supplies.

Partially due to these concerns, firing ranges increasingly turned to the use of bullet containment chambers to capture fired bullets and fragments thereof. The bullets may be recycled or otherwise disposed of in accordance with environmental regulations, thereby significantly reducing the risks of lead escaping into the environment.

Bullet containment chambers typically include an opening through which the bullet enters, a deceleration mechanism for slowing the bullet to a stop, and a container mechanism for holding the bullet until it is retrieved from the containment chamber. Either end of the containment chamber includes a sidewall which limits the lateral travel of the projectile. If a projectile impacts the side wall, it may ricochet or, if a high powered round, may puncture the side wall.

One early bullet containment chamber is shown in U.S. Pat. No. 684,581 to Reichlin. The chamber had an opening over which a target was placed. The chamber sloped downwardly and inwardly to provide a rounded deceleration path. A container area was also provided at the bottom of the unit to collect bullets.

An alternate design is shown in U.S. Pat. No. 2,013,133 to Caswell. Rather than directing the bullet in a vertically circular path, the bullet stop of Caswell had the bullet travel initially in a generally horizontal circle as it decelerated. As the bullet slowed, it would drop to the bottom of the deceleration chamber where it could be retrieved.

Yet another bullet containment system is contained in U.S. Pat. No. 5,535,662 to Bateman. The containment system utilizes angled impact plates to decelerate bullets. Once the bullets had slowed sufficiently, they would fall into a canister mounted below the containment chamber.

All of the above containment systems suffer from the same common problem. Specifically, the side walls limit the ability of the bullet to travel laterally and raise the concerns discussed above with respect to ricochets and damaging the side plates when the shooter is shooting at an angle other than straight ahead.

In addition to the above, many of the prior art containment systems have problems with bullets sticking to the deceleration plates. Additionally, those which provide a containment chamber often limit the access to the chamber. If the chamber becomes damaged or needs maintenance or repair work, it is extremely difficult to access the interior of the trap.

Thus, there is a need for an improved bullet trap which allows cross-shooting with less risk of ricochets or damaged side plates. There is also a need for a trap which allows for easier repairs and for access to the interior of the trap.

SUMMARY OF THE INVENTION

It is an object of the present invention to provide an improved bullet trap.

It is another object of the present invention to provide a bullet trap which may be used with cross-shooting.

The above and other objects of the invention are realized in specific illustrated embodiments of a bullet trap, a preferred embodiment having greater than eight feet between side walls.

In accordance with one aspect of the invention, the bullet trap has a plurality of segments disposed adjacent one another, with at least two adjoining segments not having a sidewall therebetween.

In accordance with yet another aspect of the invention, a plurality of segments are attached in a row with facing strips disposed so as to hold the segments together. The plurality of segments enables the containment chamber to be considerably wider than eight feet. This, in turn, significantly increases the ability to shoot at wide angles without fear that the bullet will damage the trap or will ricochet.

In accordance with another aspect of the invention, the containment chamber, is formed by a plurality of elongate plates disposed in generally horizontally extending rows. The plates of each row are disposed adjacent the plates of each neighboring row, but are not fixedly attached thereto. Thus, the plates of any particular row are able to deform slightly when impacted by a bullet without placing any additional stress on adjacent rows of plates.

In accordance with yet another aspect of the present invention, each row of plates (or elongate plate) is held in a non-rigid engagement with a support member. This can be accomplished by having the plates of a row nest in a slot in a support panel or they can rest on a common interior support. Unlike conventional bullet traps, this allows the plates to move slightly when impacted by a bullet. This, in turn, minimizes bullets sticking to the plate.

Additionally, by forming the containment chamber by a plurality of plates which are not fixedly attached to one another, a person charged with maintaining the trap can remove some or all of the plates from a particular row to gain access into the interior of the trap. This can facilitate maintenance or cleaning of the trap. It also allows a plate to be readily replaced if it is some how damaged. Rather than cutting through the plate and replacing it with a new piece, a damaged plate can be removed and replaced. Instead of the bullet trap being unusable for days or weeks, replacing a damaged plate can have the bullet trap usable again within hours. Additionally, because welding is not used on the plate steel, the integrity of the steel is maintained.

In accordance with another aspect of the present invention is that containment chamber is at least partially surrounded by a containment shell. This enables the rows of plates to move without concern that lead dust may escape from the containment chamber.

In accordance with yet another aspect of the present invention, one or more doors are disposed in the containment shell. The doors provide ready access to the containment chamber and associated parts, such as the hopper at the bottom of the bullet trap, or the rows of plates for maintenance.

In accordance with still yet another aspect of the invention, the doors are biased in a closed orientation to prevent accidental release of lead tainted air. This can be accomplished by a spring loaded door, or the use of a magnetic seal on the door.

In accordance with another aspect of the present invention, pieces of plate are held together by a backing plate and fasteners which are attached to each plate. Preferably, the fasteners are bolt shanks which are spot welded to the plates along an edge to be joined. Spot welding is preferred because it has less effect on the steel plate. Once the bolt shank is welded to the edges of the pieces to be joined, a backing strip with holes cut or drilled to receive the bolt shanks is mounted so that the backing strip covers the seam between the plates and securely holds the plates together.

The use of the backing strip in this manner provides several advantages. First, it is easy to mount and remove. Second, it securely holds the plates of steel together and provides a tortuous path which prevents projectiles from passing between the plates. Third, it provides a generally smooth bullet impact surface on the front of plates to reduce the likelihood of ricochet. Fourth, the slight difference between the size of the holes in the backing plate allows for expansion and contraction of the metal plate as temperatures change without stressing the plates or causing buckling. A very small gap can even be left between the plates which is filled with caulk or some other damping mechanism.

In accordance with still another aspect of the present invention, a plurality of rounded or c-shaped plates are used to decelerate bullets. Unlike planar plates, they are less likely to be deformed after repeated impacts of projectiles.

In accordance with another aspect of the present invention, the bullet trap includes a support beam. The support beam is configured to support both the channeling plates and the bullet containment chamber. Furthermore, in accordance with one aspect of the invention, the support beam can form part of the bullet containment chamber.

In accordance with still another aspect of the present invention, the support beam can be formed from individual sections to allow hangers or supports to be attached to the support beam quickly and economically.

In accordance with still another aspect of the present invention, the support beam can be of varying dimension to thereby provide adequate support while minimizing the amount of steel required to form the beam.

In accordance with yet another aspect of the present invention, the bullet containment chamber is held in place at least partially by one or more clamp mechanisms to ensure that the chamber backing plates are securely held in place.

In accordance with still another aspect of the invention, the support beam can include one or more openings for receiving the clamp mechanisms. Thus, the clamp mechanisms are held by the support beam to ensure that the support beam and the containment backing plates are securely attached to one another.

In accordance with still another aspect of the invention, a variety of different attachment mechanisms are provided for securing plates adjacent one another to prevent a bullet from passing between the seam along the plates.

In accordance with still another aspect of the invention, the bullet trap includes impact or channeling plates forming a primary impact zone, a secondary impact zone and a second primary impact zone prior to the aperture of the bullet containment chamber to thereby decrease wear on the bullet trap.

BRIEF DESCRIPTION OF THE DRAWINGS

The above and other objects, features and advantages of the invention will become apparent from a consideration of the following detailed description presented in connection with the accompanying drawings in which.

It is appreciated that not all aspects and structures of the present invention are visible in a single drawing, and as such multiple views of the invention are presented so as to clearly show the structures of the invention.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. Additionally, it should be appreciated that the components of the individual embodiments discussed may be selectively combined in accordance with the teachings of the present disclosure. Furthermore, it should be appreciated that various embodiments will accomplish different objects of the invention, and that some embodiments falling within the scope of the invention may not accomplish all of the advantages or objects which other embodiments may achieve.

Figure 1:
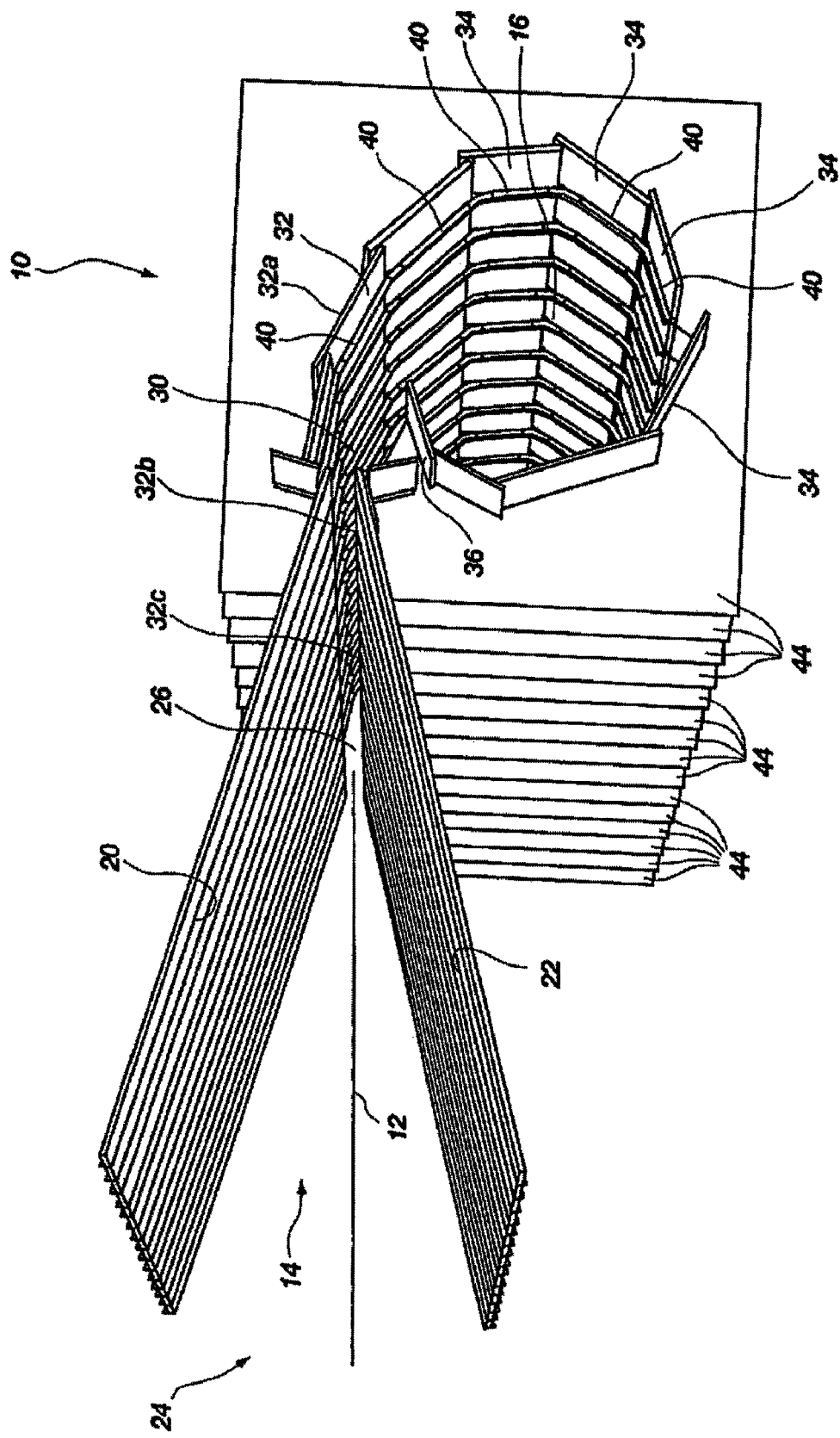
FIG. 1 shows a perspective view of a bullet trap made in accordance with the principles of the present invention.

Referring to FIG. 1, there is shown a perspective view of a bullet trap, generally indicated at 10, made in accordance with the principles of the present invention. The bullet trap 10 includes a channel 14 and a containment chamber 16.

The channel 14 has an upper plate surface 20, which is preferably formed by a plurality of channeling plates connected to one another, and a lower plate surface 22, preferably formed by a plurality of channeling plates. The upper plate surface 20 and lower plate surface 22 are arranged on complementary acute angles to the generally horizontal zone of projectile travel 12. As a bullet is fired it travels from a wide opening 24 in the channel 14, to a narrow opening 26. If a projectile is on a trajectory which is lower than the narrow opening 26 it is deflected by the lower plate surface 22 of the channel 14 back toward a conforming path. If a projectile is on a trajectory which is higher than the narrow opening 26 it is deflected by the upper plate surface 20 of the channel 14 back toward a conforming path. In any event, the projectile is guided into the narrow opening 26 by the plates which are at generally acute angles (10 degrees-30 degrees, but optimally about 15 degrees) to horizontal, so that the projectile remains in tact while traveling through the channel and into the chamber.

The narrow opening of the channel 26 is ideally substantially coextensive with an ingress 30 to the chamber 16. As the projectile travels through the ingress 30 it impacts with the primary impact plate surface 32. As with the channel 14, this is preferably formed by a plurality of plates 32a, 32b, 32c held together in a horizontal line. Thus, if plates which are 2 feet tall and 8 feet wide are used, the primary impact plate surface 32 will be about 24 feet wide.

The impact plate 32 is preferably at an equal or greater angle of incidence with the generally horizontal zone of projectile travel so that the impact with the plate 32 is of equal or greater force than the general impact the projectile may have had with either the upper 20 or lower 22 channel plate. The result of projectile impact with the primary impact plate 32 is that the bullet or fragments thereof are deflected into in a sequence of impact plates surfaces 34 which are preferably of an increased angle of incidence, than the primary impact. As with the other plate surfaces, the impact plate surfaces 34 are preferably formed by a plurality of impact plates held together in generally horizontal lines.

A terminal impact plate surface 36 terminates adjacent the chamber ingress 30. Thus, the impact plate surfaces 32-36 form a series of more or less continuous impact surfaces extending from the top of the chamber ingress 30, around to the bottom of the chamber ingress. Likewise, by having the surfaces of the channel 14 and containment chamber 16 formed by horizontally juxtaposed plates, a channel 14 and containment chamber 16 can be formed with considerable width without the use of sidewalls. The absence of sidewalls allows the bullet trap 10 to be used for cross-shooting, i.e. shooting at a variety of angles, without the disadvantages sidewalls provide.

The rows of plates forming the primary impact surface 32 and other impact surfaces 34, 36 are supported by one or more interior support frame(s) 40 and support legs 44. The plates forming the impact surfaces 32-36 rest on the frame, and typically fit within slots formed in the support legs 44. In one embodiment, however, the plates forming the impact surfaces 32-36 are not fixedly attached to the support frame(s) 40 or to the support legs 44. In fact, the plates forming the impact surface are not rigidly attached to one another. Not only does this save on manufacturing costs (i.e. there is no welding), it also allows the plates to move slightly each time they are impacted by a bullet. This in turn tends to knock lead debris from the plates, rather than allowing it to accumulate.

An additional advantage of this approach is that the impact surfaces can be readily replaced. For example, the primary impact surface 32 is prone to wear faster than other impact surfaces because the bullets impacting that surface are at a higher velocity. If the bullets cause wear of the primary impact surface, the operator of the range need only disassemble and remove the primary impact surface. A new primary impact surface can then be added and reassembled. With prior art configurations, replacing the primary impact surface is nearly impossible. Furthermore, the entire trap could be disassembled and reassembled if desired. This would allow a user to move the trap to different locations without cutting welds, etc.

In addition to holding the support frame 40 in place, the support legs 44 support the weight of the trap. This is important because, unlike the trap discussed in U.S. Pat. No. 5,535, 662, the bullet trap 10 of the present invention is generally not built as individual containment units and then brought together. Rather, a plurality of open segments are attached to one another to form a large containment chamber having extended width without sidewalls, or elongate impact surfaces are formed and then they are placed in an array to form an elongate bullet containment chamber. This distance is greater than eight feet wide and preferably much wider, i.e. 20 to 40 feet wide. Such width allows for a much greater angle of cross-shooting while minimizing the risks of ricochet, etc. It also helps to minimize costs.

Figure 2:
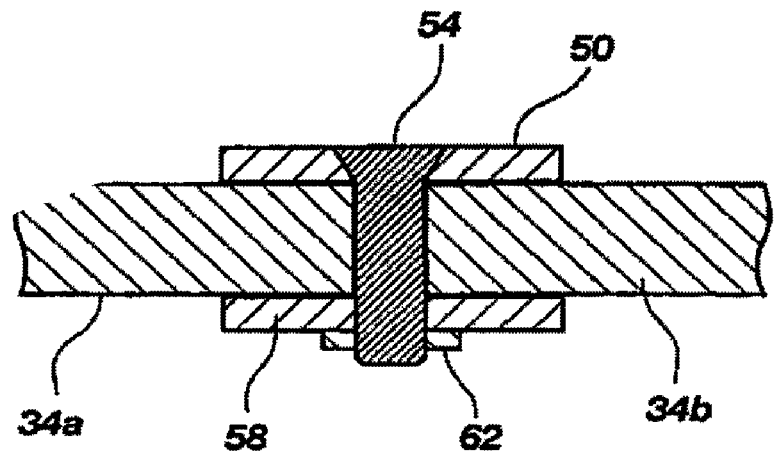
FIG. 2 shows a cross-sectional view of two adjoining plates connected by a facing strip in accordance with one aspect of the present invention.

Turning now to FIG. 2, there is shown a cross-sectional view of a pair of impact plates 34a and 34b joined together by a facing strip 50 in accordance with one aspect of the present invention. The facing strip 50 can be made from the same type of steel plate or other metal as the individual plates.

The facing plate 50 covers the space between the two plates 32a and 32b and helps hold them together. The facing plate 50 may be welded to the plates, which can also be welded to each other. Such a construction, however, is expensive, risks compromising the steel due to the welding, and makes repair very difficult.

In the alternative, the facing plates 50 can have a bolt 54 or similar mounting structure attached to or extending therethrough, A backing plate 58 or a washer can be disposed on the opposing sides of the plates 32a and 32b and a nut 62, or other fastener is used to secure the bolt. Tightening the nut 62 squeezes the facing plate and backing plate or washer against the plates 32a and 32b and secures them together.

In constructing the trap, a containment chamber can be built in a conventional manner with the impact plates being attached to one another. However, instead of placing sidewalls on the sides of the containment chamber, it is attached by the facing plates to other containment chambers to form one large containment chamber uninterrupted by sidewalls. Thus, the potential width of the bullet trap is virtually limitless and cross-shooting can occur at a wide variety of angles.

Likewise, the elongated containment chamber can be built by a plurality of elongate impact surfaces which are placed adjacent one another in a generally circular pattern to define a bullet containment chamber. In such a configuration, there are not a series of chambers, per se, but one long chamber defined by one impact surface at a time.

Figure 2A:
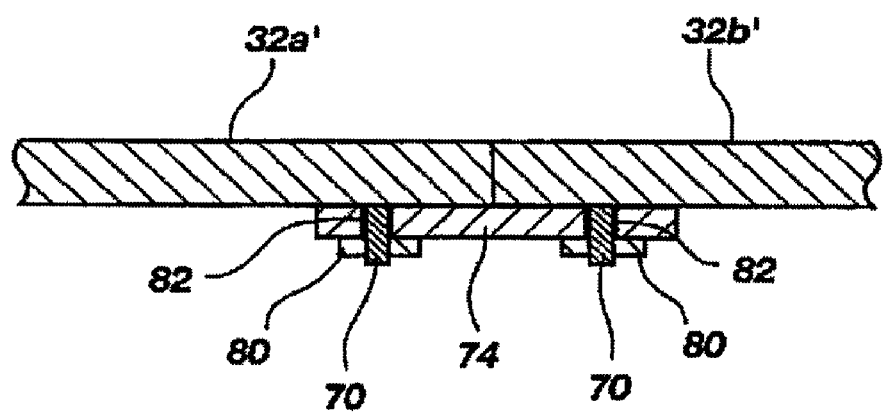
FIG. 2A shows a cross-sectional view of an alternate method for attaching two plates in accordance with the principles of the present invention.

Turning now to FIG. 2A there is shown an alternate embodiment for attaching two plates together. As shown in FIG. 2A, each of the plates 32a' and 32b' has a stud 70 attached thereto. Ordinarily, a plurality of studs, in the form of bolt shanks, are attached to the plates. This is best accomplished by use of a spot welder which will quickly attach the bolt shank to the metal plates with little risk of softening the metal.

The two plates 32a' and 32b' are held together by a backing plate 74 which has holes for receiving opposing studs 70 of the plates. A pair of nuts 80 are then used to hold the studs 70 in the holes of the backing plate 74, thereby holding the plates 32a' and 32b' together.

One marked improvement of the configuration shown in FIG. 2A is that there is no facing plate on which a bullet might ricochet. The backing plate 74, however, does provide a tortuous path. This significantly reduces the risk of bullet fragments flying through small openings between the plates, commonly called splatter through. The position of the backing plate 74 also allows the opposing side to have a clean appearance. This is particularly advantageous on the plates 20 and 22 which guide the bullet into the containment chamber. Rather than having a number of facing plates, the plates appear on the front side to only be resting next to each other, but are securely mounted together on the back side.

A second marked improvement achieved by the use of studs 70 and a backing plate 74 is the compensation for thermal expansion. The holes 82 formed in the backing plate 74 are slightly bigger than the studs 70. As the plates 32a' and 32b' expand and contract, the backing plate allows for small adjustments, i.e. up to about 1/8-1/16 of an inch. This prevents warping, etc. without compromising the joint. If a bullet hits a joint directly, a small amount of lead can enter between the two plates 32a' and 32b'. Once they impact the backing plate, however, the inertia is spent and the risk of splatter through is virtually nonexistent.

Figure 3:
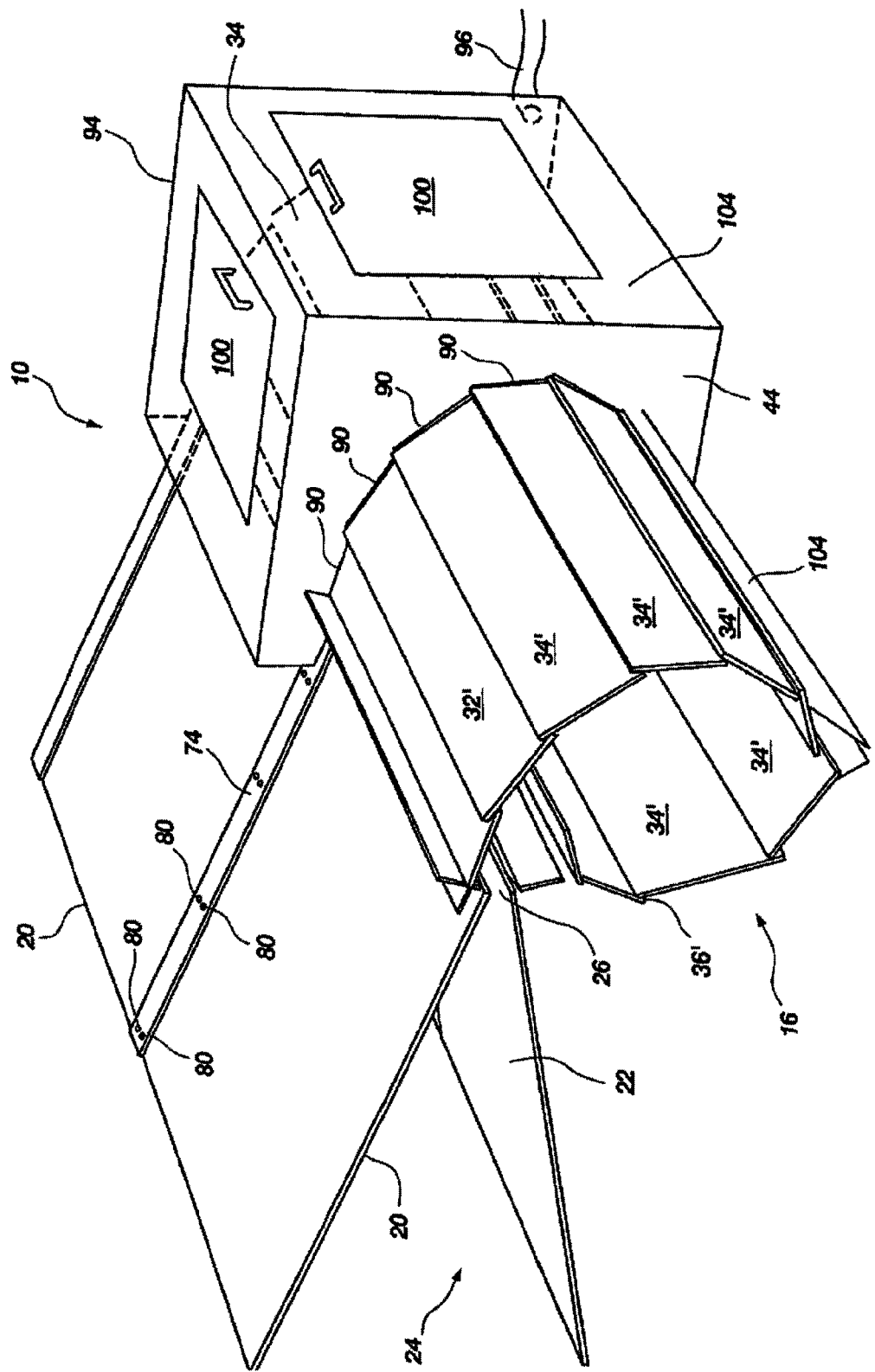
FIG. 3 shows a partial cut-away view of a bullet trap configured in accordance with the present invention having a containment shell at least partially surrounding the containment chamber.

Turning now to FIG. 3, there is shown a partially cut-away view of a bullet trap 10, formed in the manner discussed above. The bullet trap 10 has channel 24 defined by plates forming an upper plate surface 20 and a lower plate surface 22. The channel extends from a wide opening 24 to a narrow opening 26 which leads into the chamber, generally indicated at 16.

The containment chamber 16 is formed by a plurality of elongate plate arrays 32', 34' and 36'. Each plate array 32', 34' and 36' can be made from a single long piece of hardened steel, or can be smaller plate segments attached together in a manner discussed above with respect to FIGS. 2 and 2A. Additionally, other attachment mechanisms can be used if desired.

The plates forming the plate arrays 32', 34' and 36' are disposed about a support frame, such as frame 40 of FIG. 1. The plate arrays 32', 34' and 36' can be attached to the support frame, or they can also remain unattached. In the unattached version, the support frame supports the plate arrays, it also allows them to be deflected slightly by the impact of the bullet. The deflection helps knock loose lead dust and fragments which remain on the plate arrays. The lack of rigid attachment also facilitates servicing of the bullet trap 10.

The plate arrays 32', 34' and 36' also can be supported by nesting in slots in a support leg 44 which supports the weight of the trap. The slots are designed to hold the plate arrays 32', 34' and 36' in desired shape while still allowing some movement of the plates.

Also shown in FIG. 3 is a containment shell 94 which is disposed about the containment chamber 16. Because the containment chamber 16 is formed by plate arrays 32' 34' and 36' which are not fixedly attached together, small amounts of lead dust can escape between the arrays. The containment shell 94, however, prevents the dust from leaking into the atmosphere surrounding the trap. If desired, a vacuum system 96 can be disposed in communication with the containment shell 94 or directly into the containment chamber 16.

Disposed in the containment shell 94 is one or more doors 100. The doors 100 provide access to the interior of the containment shell 94 without having to remove the containment shell. Thus, the operator of the bullet trap can perform maintenance or repairs on the containment chamber 16, or on the hopper 104 or conveyer mechanism (not shown) for transporting bullets without the requirement of removing bolts, etc. This also limits the area of the containment chamber which is exposed to the environment, thereby limiting concerns of lead containment.

Figure 3A:
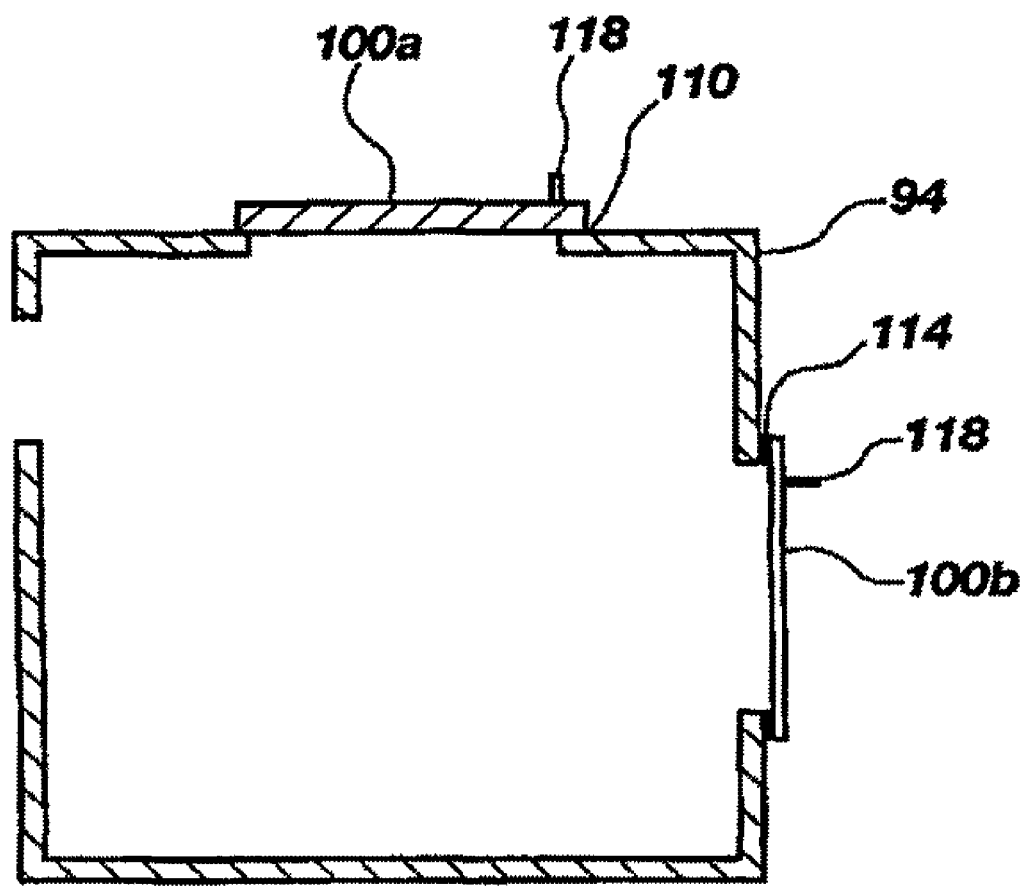
FIG. 3A is a cross-section of the containment shell.

Turning to FIG. 3A, there is shown a cross-sectional view of the containment shell 94. It will be appreciated that, while the shell can completely surround the containment chamber 16, it can also be made to wrap around only a portion of the containment chamber. Such a configuration might be used, for example, if some of the impact plate arrays 32', 34' and 36' were welded together or otherwise attached to each other (i.e. some sort of filler) to eliminate the risk of lead dust escaping from the containment chamber along those portions.

FIG. 3A also shows the doors 100a and 100b. The top door 100a is preferably provided with a spring loaded hinge 110. The hinge helps to automatically return the door 100a to its closed position when it is released.

The containment shell 94 also includes a second door 100b. The door 100b is provided with a magnetic seal 114 which holds the door closed until the seal is broken. The door 100b may then be opened to repair the containment chamber, to clean the hopper or remove containers which receive the bullets. Once the repair, etc., is completed, the door 100b need merely be pushed closed to prevent lead inside of the containment shell from escaping.

A handle 118 is provided on each door 100a and 100b to facilitate opening and closing the door. Thus, the door preferably forms a tool-less entry port into the containment shell 94.

Figure 4:
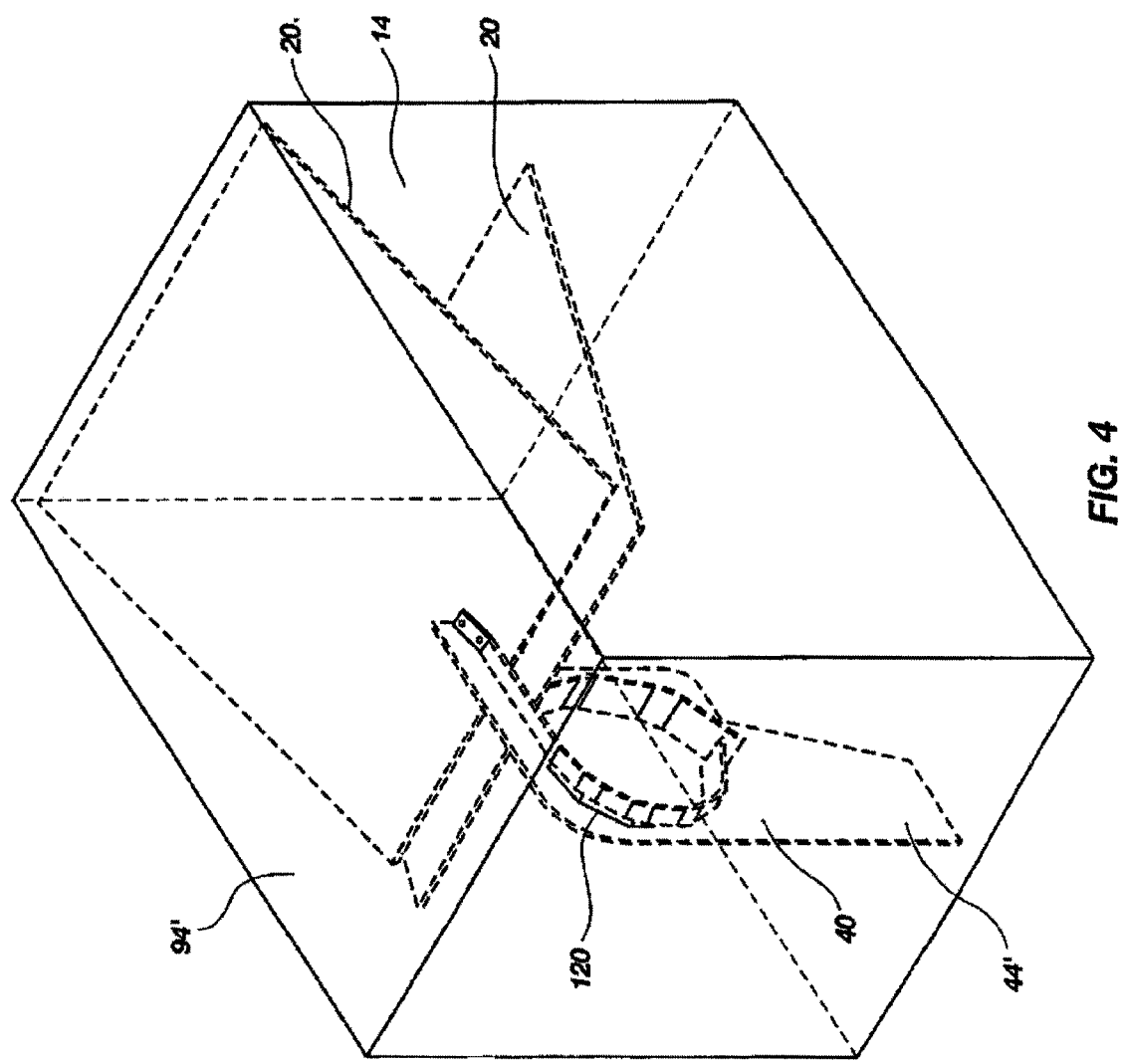
FIG. 4 shows an alternate embodiment of a containment chamber with a support leg and support frame disposed therein.

Turning now to FIG. 4, there is shown an alternate embodiment of a containment shell 94'. The containment shell 94' extends outwardly to enclose the plates forming the upper impact surface 20 and the lower impact surface 22 of the channel 14 leading into the containment chamber. The plate arrays forming the containment chamber have been omitted in FIG. 4 to show the support frame 40 and support leg 44' more clearly.

The support frame 40 preferably has two halves formed from continuous pieces which are angled to support the impact plate arrays. (If desired, a single piece frame could be used with the frame extending over the opening by which bullets fall from the trap). The plates rest on support frame 40 to provide the generally round shape of the containment chamber. The plates may abut against the support leg 44', or the support leg can have slots 120 formed therein for receiving the impact plates. It is preferred however, that the slots 120 be sufficiently large to allow some movement of the impact plates when impacted by a round.

The containment shell 94' also lacks doors for accessing the containment chamber, hopper (not shown), etc. Such a containment shell could be used when an automated bullet removal system is provided. However, such a configuration is still disadvantageous, as it will require partial disassembly to make any repairs as they become necessary.

Figure 5:
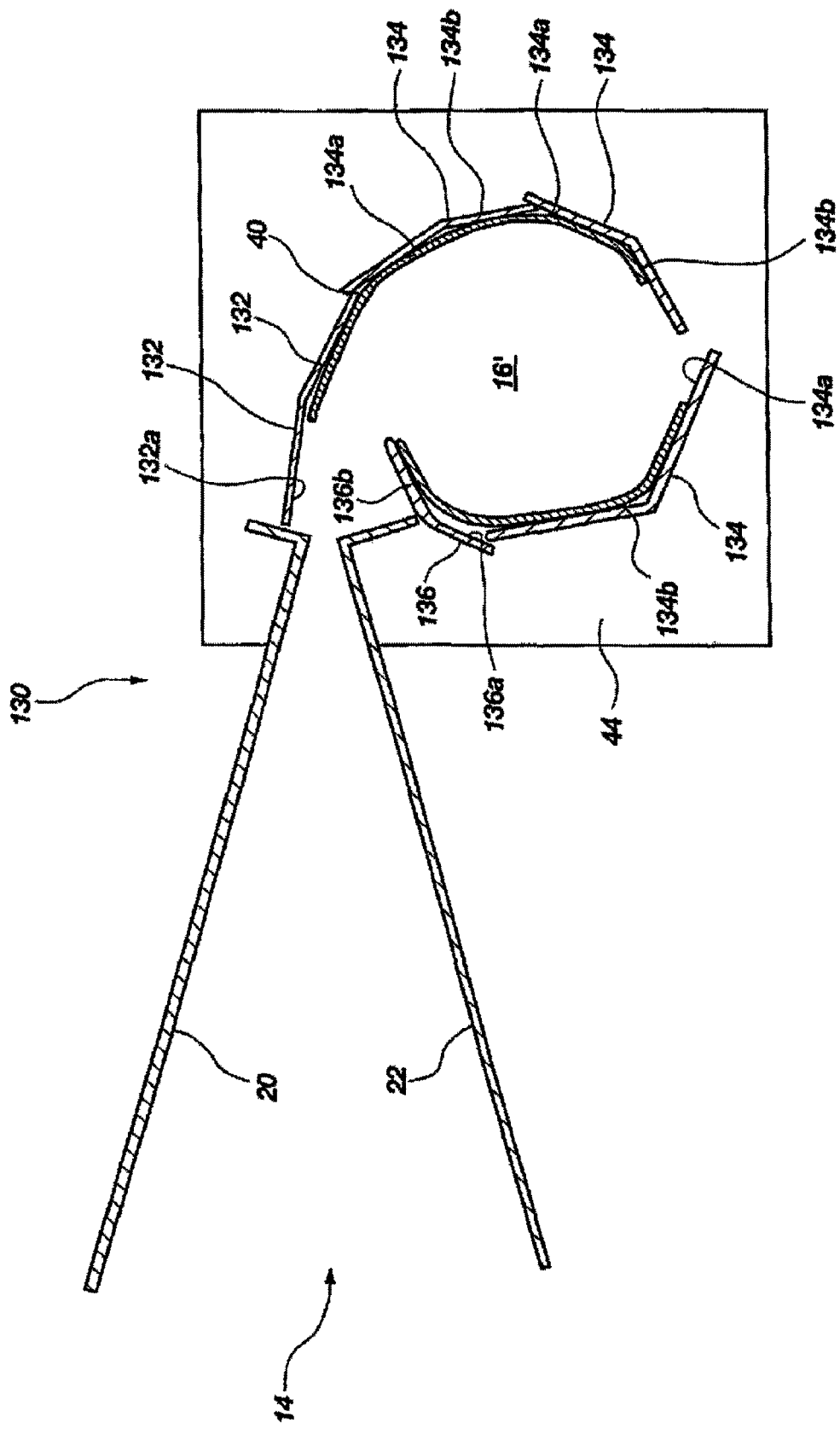
FIG. 5 shows an end view of a bullet trap made in accordance with another aspect of the present invention.

Turning now to FIG. 5, there is shown a side cross-sectional view of a bullet trap, generally indicated at 130. The bullet trap 130 includes the channel 14 with the upper and lower impact surfaces 20 and 22 for directing the bullet into the containment chamber 16'. Rather than being formed by a plurality of planar impact plates, the containment chamber 16' includes a plurality of C-shaped or curved impact plates. A primary impact plate 132 has first and second impact surfaces 132a and 132b, as does each of the secondary impact plates 134, 134a and 134b and the terminal impact plate 136, 136a and 136b.

The curved plates 132, 134 and 136 facilitate construction of the bullet trap, as fewer plates are required to assemble the trap. Additionally, because the plates are curved, the bullet will still tend to ricochet and impact the impact surfaces, rather than simply slide around the deceleration chamber as is common in circular or helical traps. Having the bullet forcefully impact the impact plates lessens the amount of lead dust which is released as the bullet is brought to a stop.

The impact plates 132, 134 and 136 are held in place by the support frame 40 and the support leg. Those skilled in the art will appreciate that either the support frame 40 or the support leg 44 could be omitted. Furthermore, numerous other configurations for holding the plates can be used. This can include a free mounting situation, as described above, wherein the plates are not fixedly attached to support frame 40 or the support leg 44. In the alternative, the curved plates can be attached in a conventional configuration where they are fixedly attached at the ends or on other locations.

Figure 6:
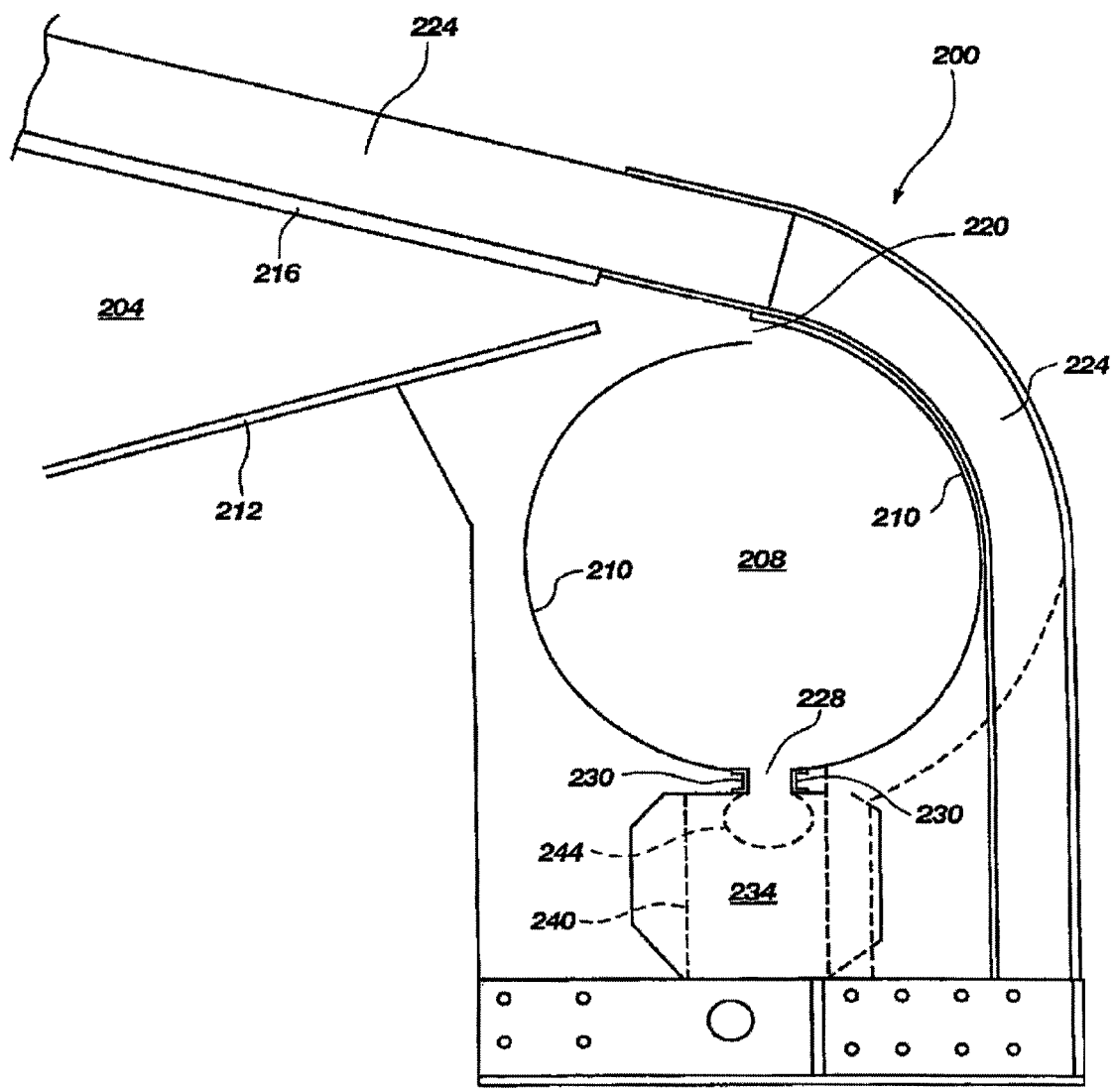
FIG. 6 shows a side cross-sectional view of a bullet trap made in accordance with the principles of the present invention.

Turning now to FIG. 6, there is shown an alternate embodiment of a bullet trap, generally indicated at 200, made in accordance with the principles of the present invention. The bullet trap 200 includes a channel portion 204 and a bullet containment chamber 208 formed by a pair of chamber backing plates 210. The chamber backing plates are essentially impact plates similar to those discussed above, but are sufficiently round that the number of impacts are minimized. The channeling portion 204 is formed by a plurality of plates 212 and 216 which form lower and upper plate surfaces, respectively, for channeling bullets into an aperture 220 of the bullet containment chamber 208.

The plates 216 which form the top of the channeling portion 204 are held in place by a support beam 224. In traditional bullet traps, the support beam is a generally straight beam which has a plurality of legs attached thereto for holding the beam in place. The bullet container is then positioned under the support beam and may be attached to the legs.

In the embodiment shown in FIG. 6, the support beam 224 is curved so that it forms its own support leg. Furthermore, the bullet containment chamber 208 can be suspended directly on the support beam. By providing a single support beam without separate legs, assembly time can be reduced. Furthermore, the support beam 224 may be modular if desired, and may be reduced in thickness as it extends toward the end of the channeling portion 204, to thereby reduce the amount of steel which is contained in the support beam.

Also shown in FIG. 6 are a pair of flanges 230 which are attached adjacent an egress 228 of the bullet containment chamber 208. The flanges 230 can be used for a variety of purposes. For example, below the egress 228 is formed a bullet disposal chamber 234. The bullet disposal chamber 234 can house buckets 240 which are manually emptied. In the alternative, it may house a disposal system 244, such as a pneumatic conveyor, a belt conveyer or a screw conveyor for transporting bullets to one end of the bullet trap where they may be disposed of properly.

When a bullet is fired at the bullet trap 200 it will initially impact one of the channeling plates 212 or 216. The bullet will then ricochet one or more times until it enters the aperture 220 of the bullet containment chamber 208. Once in the bullet containment chamber 208, the bullet will ricochet or slide to a stop along the generally circular walls of the bullet containment chamber and fall through the egress 228. The bullet will then enter the bullet disposal chamber, where it will rest in the bucket 240 or be moved by the disposal system 244.

Figure 6A:
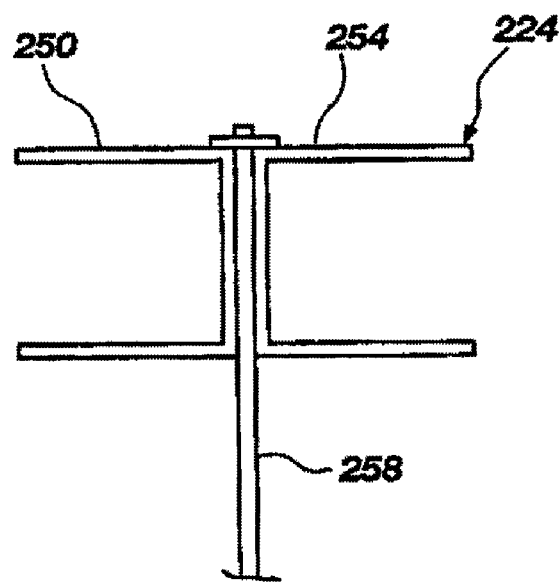
FIG. 6A shows a cross-sectional view of the support beam of FIG. 6 with a hanger.

Turning now to FIG. 6A, there is shown a cross-sectional view of the support beam 224. The support beam 224 may be formed from a single beam, such as an I-beam, or may be constructed from one or more other beam configurations. (With a modular beam, an I-beam could also be used for part of the beam, with other configurations used for other portions).

As shown in FIG. 6A, the support beam 224 is formed by two C-shaped beam members 250 and 254. This configuration is advantageous because it allows a hanger 258 to be readily attached to the beam 224. While FIG. 6 shows the plates 216 being attached directly to the support beam 224, the beams may be placed at a different angle than the plates. The hanger 258 allows for such a compensation.

Figure 6B:
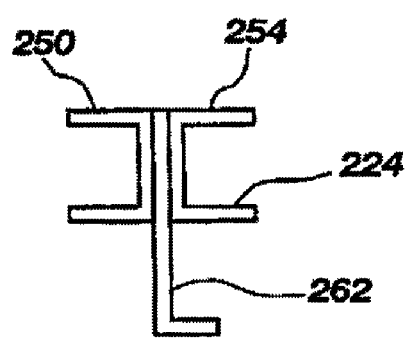
FIG. 6B shows a cross-sectional view of the support beam with a foot for supporting the support beam.

Likewise, FIG. 6B shows a similar configuration of the support beam 224. Instead of a hanger, however, a foot 262 is attached to the C-shaped beam members 250 and 254. This configuration enables the lower plates 212 to be used without numerous support legs as is currently used in similar bullet traps.

Figure 6C:
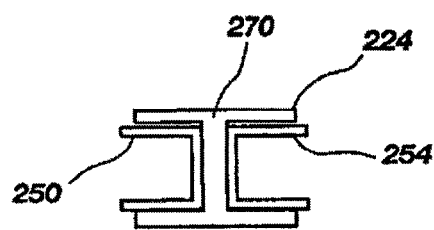
FIG. 6C shows a cross-sectional view of an alternate configuration of the support beam of FIG. 6.

FIG. 6C shows yet another configuration of the support beam 224. The support beam 224 has an I-beam 270 disposed between the C-beams 250 and 254. In such a configuration, an I-beam could be used for part of the support beam 224 with attached C-beams forming another portion of the support beam.

Figure 7:
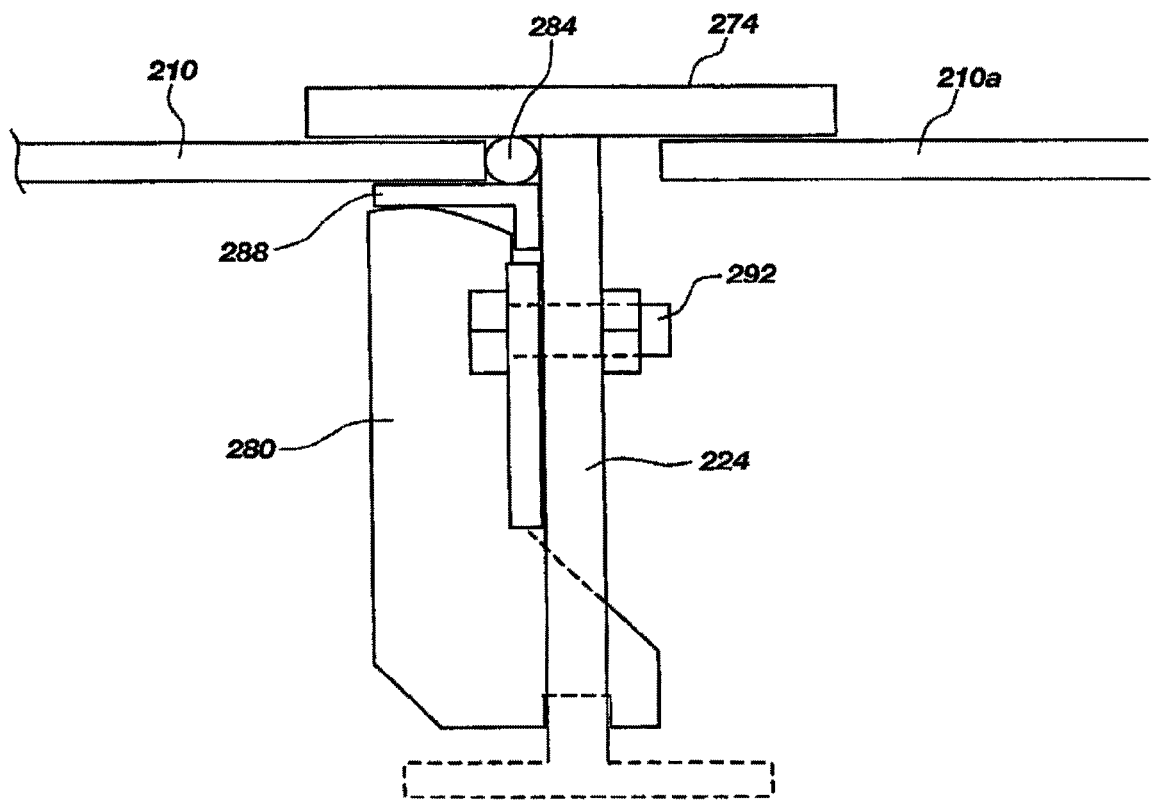
FIG. 7 shows a cross-sectional view of the bullet containment backing plates and a joint structure for holding the plates together without the need for interspaced side walls.

Turning now to FIG. 7, there is shown a cross-sectional view of a portion of the chamber backing plate 210 and support beam 224 to show a mechanism for forming the bullet containment chamber 208. As was mentioned previously, the support beam 224 can be curved. If desired, the curve may be configured to the dimensions of the back of the bullet containment chamber 208. A flange 274 of the support beam forms a facing strip which is disposed on the inside of the bullet containment chamber. The chamber backing plates 210 are then disposed against the flange 274 so that the flange covers the juncture between the plates.

While the chamber backing plates 210 could be bolted onto the flange in a similar manner as discussed with respect to FIG. 2 or FIG. 2A, or in the method taught for joining plates below., the configuration shown in FIG. 7 utilizes a clamp device or cam which applies a compressive force against the chamber backing plates 210 to prevent bullets from passing between the flange 274 and the chamber backing plates. The clamping device 280 is preferably pivotably attached to the support beam 214. Once the chamber backing plates 210 are disposed adjacent the flange 274, the clamping device 280 is rotated about a bolt 292 to force the chamber backing plates against the flange. Additionally, a sealing strip 284, made out of lead, rubber, epoxy, or other material, is placed behind the flange to ensure that no bullet fragments can escape from the bullet containment chamber 208. Additionally, a filler or wedge 288 can be disposed along the backing chamber to apply pressure from the clamping device 280 along the chamber backing plate 210 to hold the sealing strip 284 in place.

While FIG. 7 does not show the clamping device 280 engaging the backing plate 210a, it will be appreciated that the clamping device could engage both. In the alternative, clamping devices could be configured to engage the two plates in an alternating configuration, etc. Additionally, support beam 224 is shown with a dashed end opposite the flange 274 to demonstrate that a wide variety of beam configurations can be used in accordance with the principles of the present invention.

Ideally, the chamber backing plates 210 and the flange 274 of the support beam are configured with slightly different curvatures. When the clamp devices 280 are rotated into an engaging position, the pressure from the clamping devices forces one of the flange and the chamber backing plates to conform to the other, thereby ensuring that they securely engage one another and prevent bullet fragments from passing through the joint. It should be appreciated that a wide variety of clamping devices or direct bolting attachment can be used.

Turning now to FIG. 7B, there is shown a cross-sectional view of a bullet containment chamber 208 formed in accordance with the embodiment of FIG. 7. The chamber backing plates 210 which form the rear wall of the chamber are attached to the support beam 224 by the clamping devices 280 which press them against the flange 274. In this manner, the support beam 224 becomes an actual part of the bullet containment chamber 208. Additionally, because each backing plate 210 can attach to the beam 224, there is no need for side walls within the chamber 208. This prevents the requirement of using deflector plates to protect the sidewalls, and allows a wider range of cross shooting on a shooting range. Prior to the present invention, a bullet containment chamber would have side walls, or would only be as wide as a single piece of metal. While a single piece of metal can be formed to relatively long lengths, transportation and support of such a piece of metal and shaping a single piece into the desired configuration would be cost prohibitive. In the present configuration, the chamber backing plates can be joined end to end in a horizontal array to form a bullet containment chamber which is as wide as desired without any side plates intersecting the chamber.

Figure 7A:
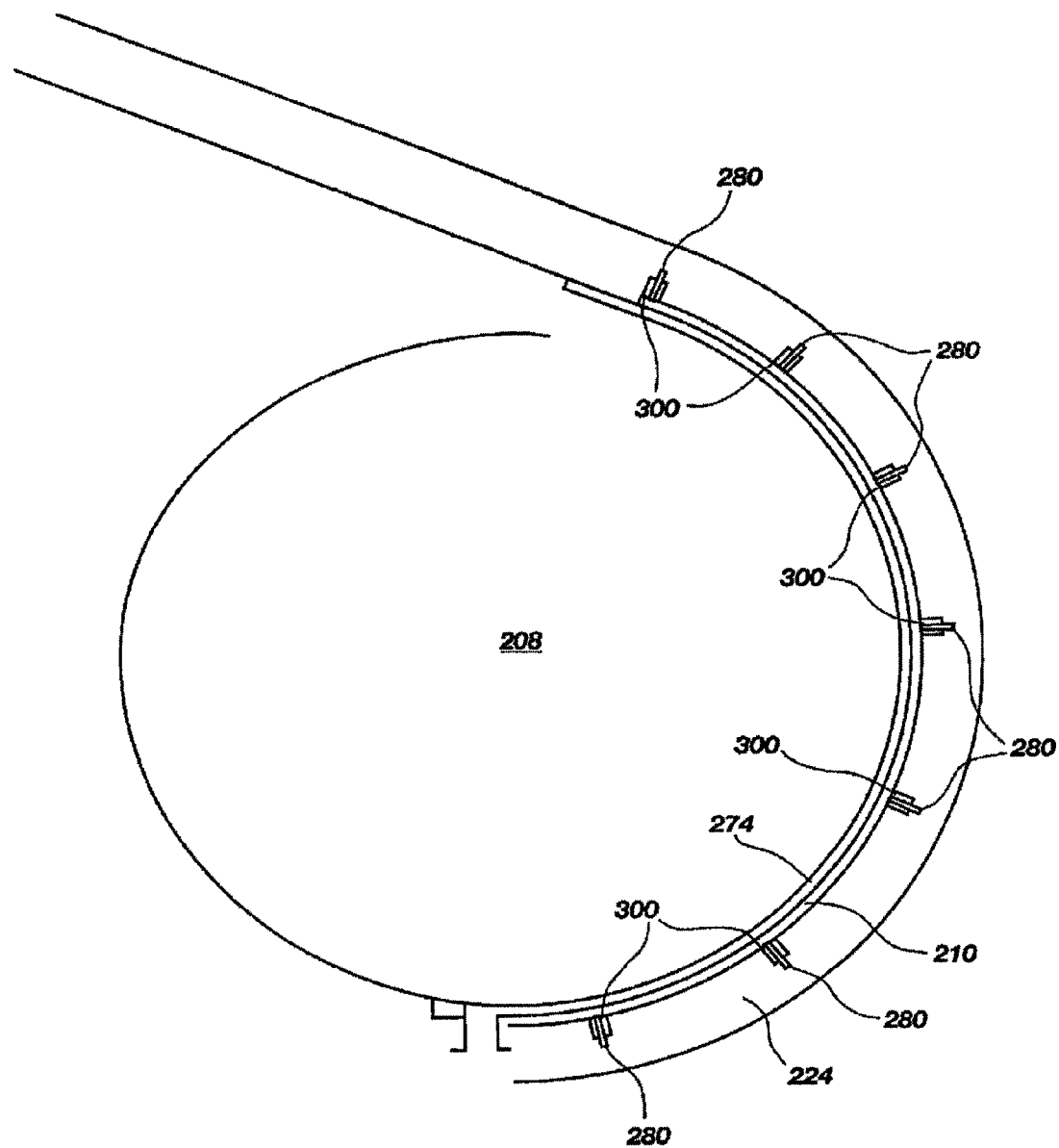
FIG. 7A shows a side view of a support beam having holes for receiving the clamping mechanism for attaching the bullet containment chamber backing plates to the support beam.

Also shown in FIG. 7A are a plurality of openings 300 or voids formed in the support beam 224. The openings 300 are configured to receive the clamping devices to allow them to move as desired. It will be appreciated, however, that the clamping devices can be formed so that they are simply attached and pivotable with respect to the support beam.

Figure 8:
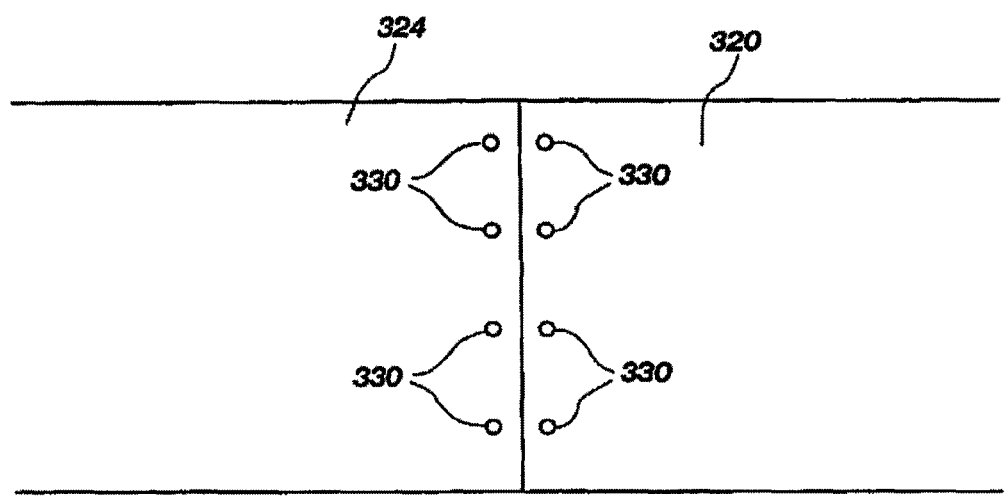
FIG. 8 shows a view of a pair of plates having an attachment mechanism attached thereto in accordance with principles of the present invention.

FIG. 8 shows a pair of plates, 320 and 324 having an alternate attachment configuration disposed thereon. Disposed along the edges of the plates 320 and 324 are a plurality of fasteners, typically in the form of nuts 330 welded to the plates. As mentioned above with respect to FIG. 2A, bolts can be welded to the plates to enable two plates to be held together without a facing strip on the shooting side of the plates. It has been found, however, that welding the nuts 330 to the plates 320 and 324 is preferred. First, the nuts 330 provide greater surface area and thereby are less likely to break. Second, it is much easier to stack plates 320 and 324 with nuts 330 attached than to stack such plates with bolts attached. Thus, the use of nuts 330 makes transport much easier.

Figure 8A:
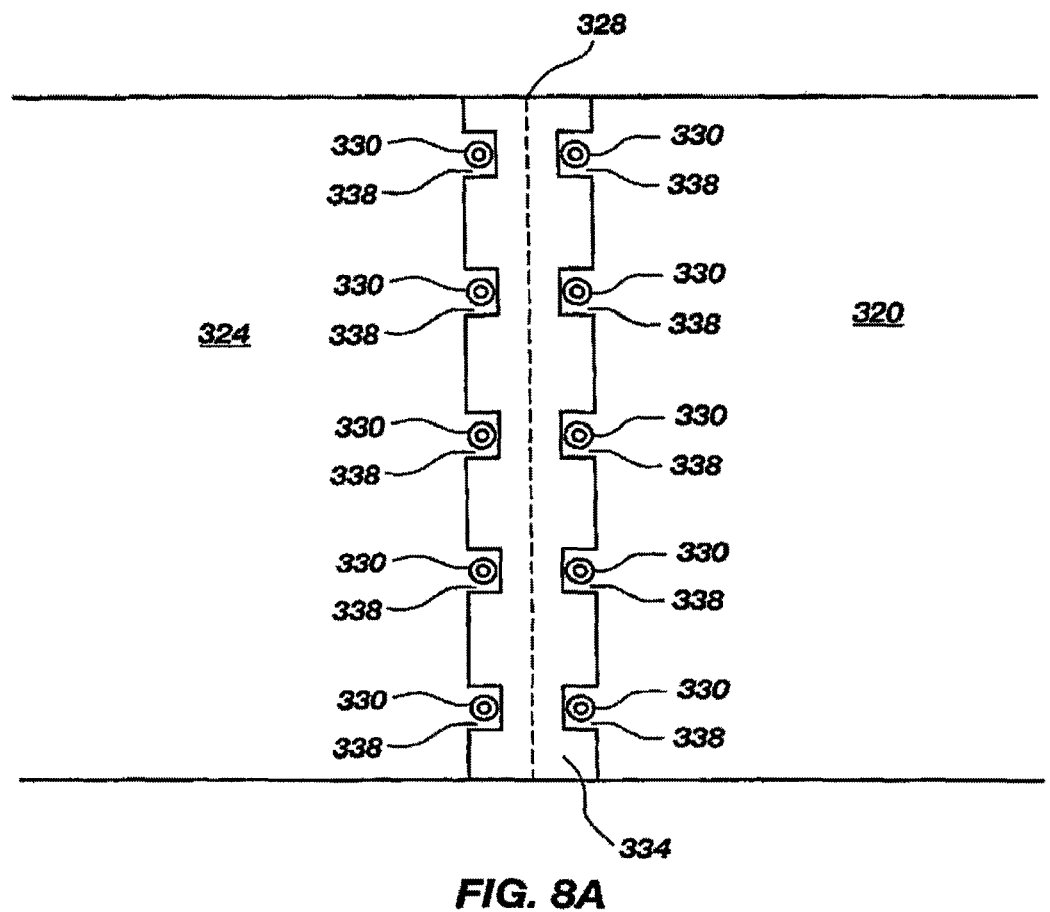
FIG. 8A shows a view of the plates of FIG. 8 having a middle plate attached thereto.

Turning now to FIG. 8A, there is shown a top view of the plates 320 and 324 with the nuts 330 attached thereto. Disposed over the seam 328 between the plates is a middle plate 334. The middle plate 334 is configured to cover the seam 328, but to not interfere with the nuts 330. Thus, the middle plate 334 has notches 338 formed therein. Those skilled in the art will appreciate that the notches can be formed as open sided voids, or could be holes formed in the middle plates. In the alternative, the middle plate could be configured to simply end inside of the nuts 330.

Figure 8B:
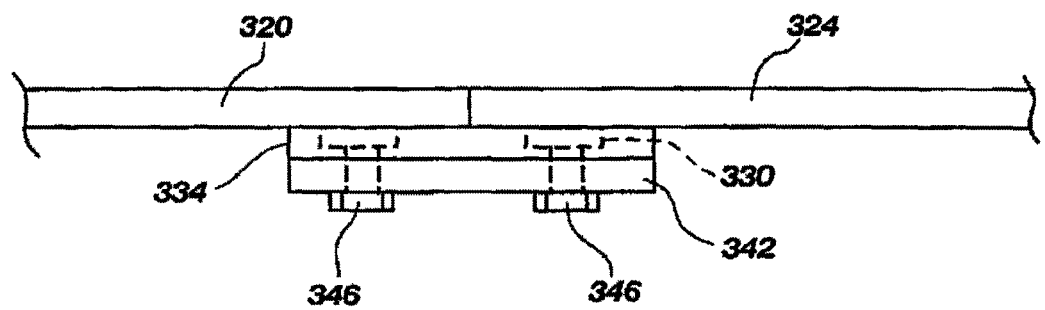
FIG. 8B shows an end view of the embodiment of FIGS. 8 and 8A with a backing plate and bolts attached.

FIG. 8B shows an end view of the plates 320, 324 and the middle plate 334. A backing plate 342 is disposed on the middle plate 334 and a pair of bolts 346 are disposed to extend through the backing plate and into engagement with the nuts 330. By tightening the bolts 346, the backing plate 342 is forced against the middle plate 334 to thereby hold the middle plate securely against the seam 328. This configuration enables plates 320 and 324 to be used to decelerate or channel bullets without having an exposed facing strip. This, in turn, increases the ability to use a bullet trap for cross shooting as there is much less risk of a ricochet, while ensuring that bullet fragments will not pass between the plates 320 and 324.

Figure 8C:
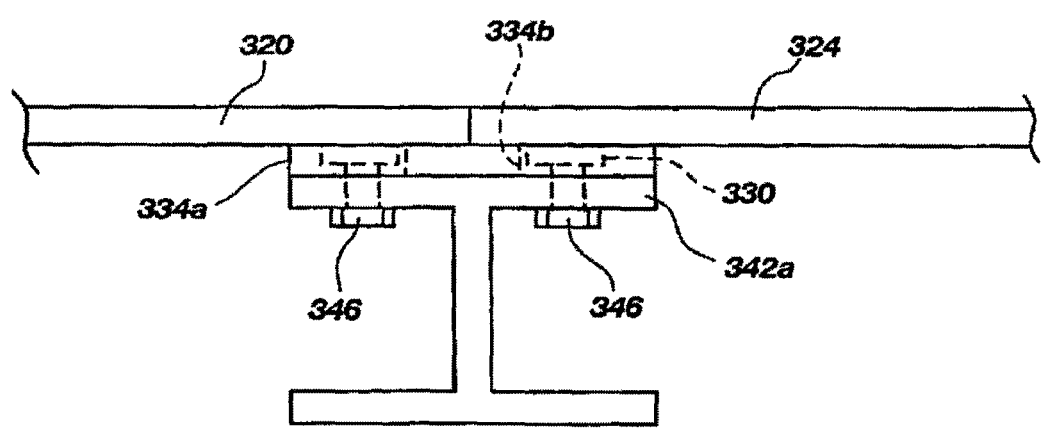
FIG. 8C shows an end view of an alternate embodiment of FIGS. 8 and 8A with a support beam forming the backing plate.

FIG. 8C shows an end view of the embodiment of FIGS. 8 and 8A. The plates 320 and 324 have middle plate 334a. As indicated by the dashed lines, the middle plate 334b can be narrower than the nuts 330.

The middle plate 334b is held in place by a backing plate 342a which is formed by a portion of an I-beam. Bolts 346 extend through the portion of the I-beam to engage the nuts 330, and thereby hold the plates 320 and 324 adjacent one another. Based on the present disclosure, those skilled in the art will appreciate that a variety of different beam configurations, including C-beams, T-beams and the like, can be used to support the plates 320 and 324 and to hold the plates next to one another.

Figure 9:
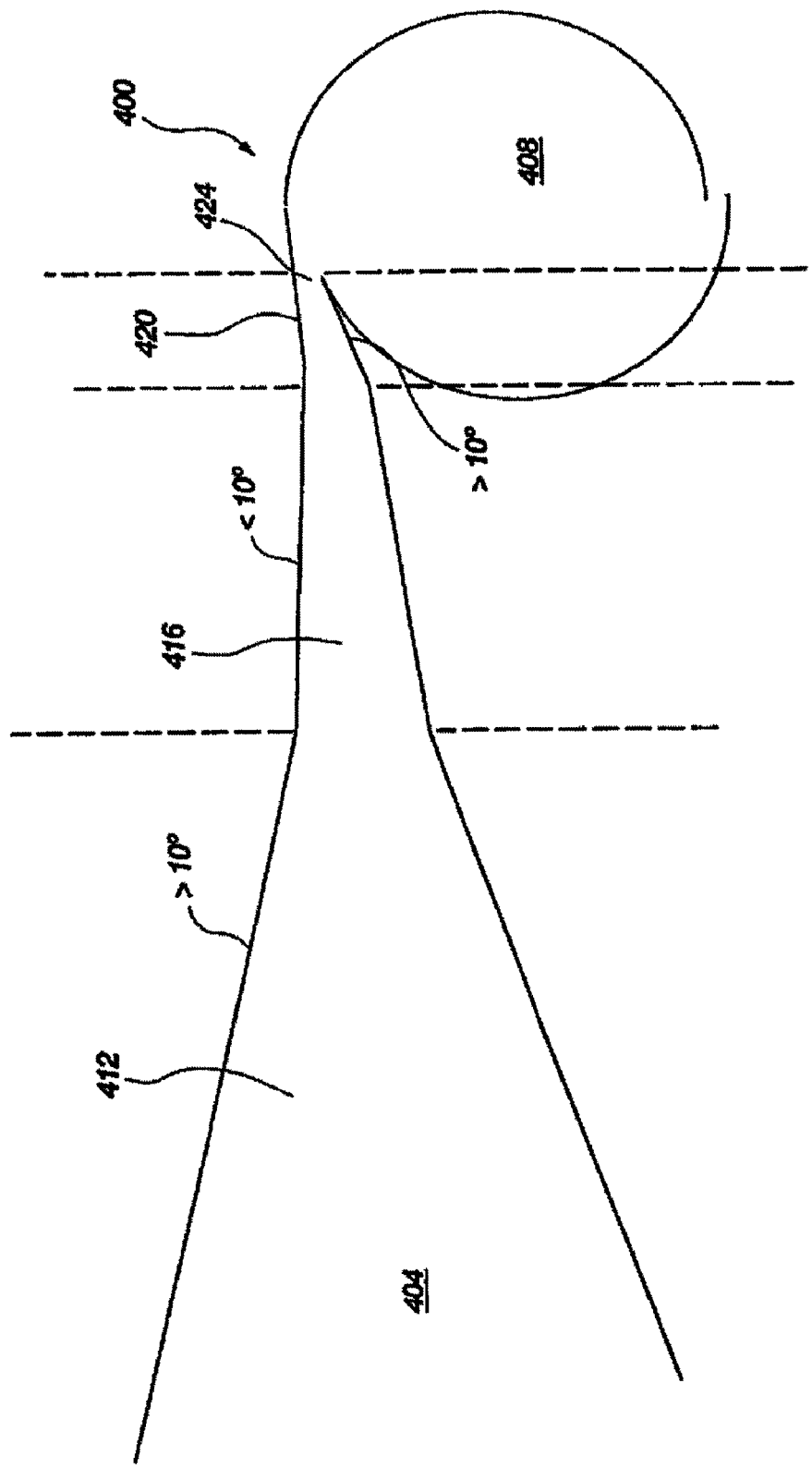
FIG. 9 shows a cross-sectional view of a bullet trap having a plurality of impact zones for decelerating bullets.

Turning now to FIG. 9, there is shown a cross-sectional view of a bullet trap having a plurality of impact zones for decelerating bullets. In the prior art, it has been recognized that it is desirable to have a very low angle of impact between the bullet and the channeling plates which direct the bullet toward the aperture of the bullet containment chamber. The common angle of the channel for a bullet trap is typically about 15 degrees for both the bottom and top plates with the top descending at an angle of 15 degrees and the bottom ascending at an angle of 15 degrees.

With such an angle, the bullets traveling horizontally will impact the channeling plates at an angle of about 15 degrees. The bullets typically ricochet off the plates and hit the opposing plates at an angle of about 30 degrees. Due to the sharper angle, this second impact point often receives more wear than the initial impact point.

Recently there has been a movement to switch over from lead to tungsten bullets. The tungsten bullets are better for the environment as they do not contain toxic lead. Unfortunately, such bullets will be harder on bullet traps. After prolonged usage, prior art bullet traps may show significant wear in the secondary impact zone.

While certain proposals have been made to reduce wear by lowering the angle of channeling plates to about 7 degrees, such an angle would require large amounts of steel and property to produce a trap large enough. In accordance with the present invention, however, it has been found that wear associated with secondary impact can be reduced significantly by providing a channel with changing angles. Thus, in FIG. 9, there is shown a bullet trap, generally indicated at 400. The bullet trap includes a channel portion 204 and a bullet containment chamber 408.

The channeling portion 404 includes a primary impact zone 412 having at least one plate surface which is disposed at greater than 10 degrees from horizontal (preferably between about 10 and 20 degrees and most preferably about 15 degrees), a secondary impact zone 416 having at least one plate surface which is less than 10 degrees from horizontal. Ideally, both the top and bottom plates surfaces in the first impact zone are disposed at about 15 degrees and the top and bottom plate surfaces of the second impact zone are disposed between 5 and 10 degrees.

In accordance with the present invention, a preferred embodiment further includes a second primary impact zone having at least one plate surface which is greater than 10 degrees and preferably between 10 and 20 degrees and most preferably about 15 degrees.

By having first, second and third impact zones 412, 416 and 420, bullets are channeled into the bullet containment chamber with less wear on the trap. Additionally the impact zones 412, 416 and 420 are configured to minimize the risk of rounds hitting the back of the containment chamber 408 without having first been decelerated. Rather, if a round passes through the aperture 424 without first hitting one of the impact zones, it will hit the top of the bullet containment chamber. The generally arcuate nature of the bullet containment chamber results in an initial impact of about 15 degrees or less, causing little damage. The bullet then travels around the bullet containment chamber 408 until it comes to a rest.

Those skilled in the art will appreciate that the bullet trap 400 can be built with a variety of construction methods, including those discussed above. Furthermore, a bullet containment chamber having a plurality of impact plates could also be used.

Figure 10:
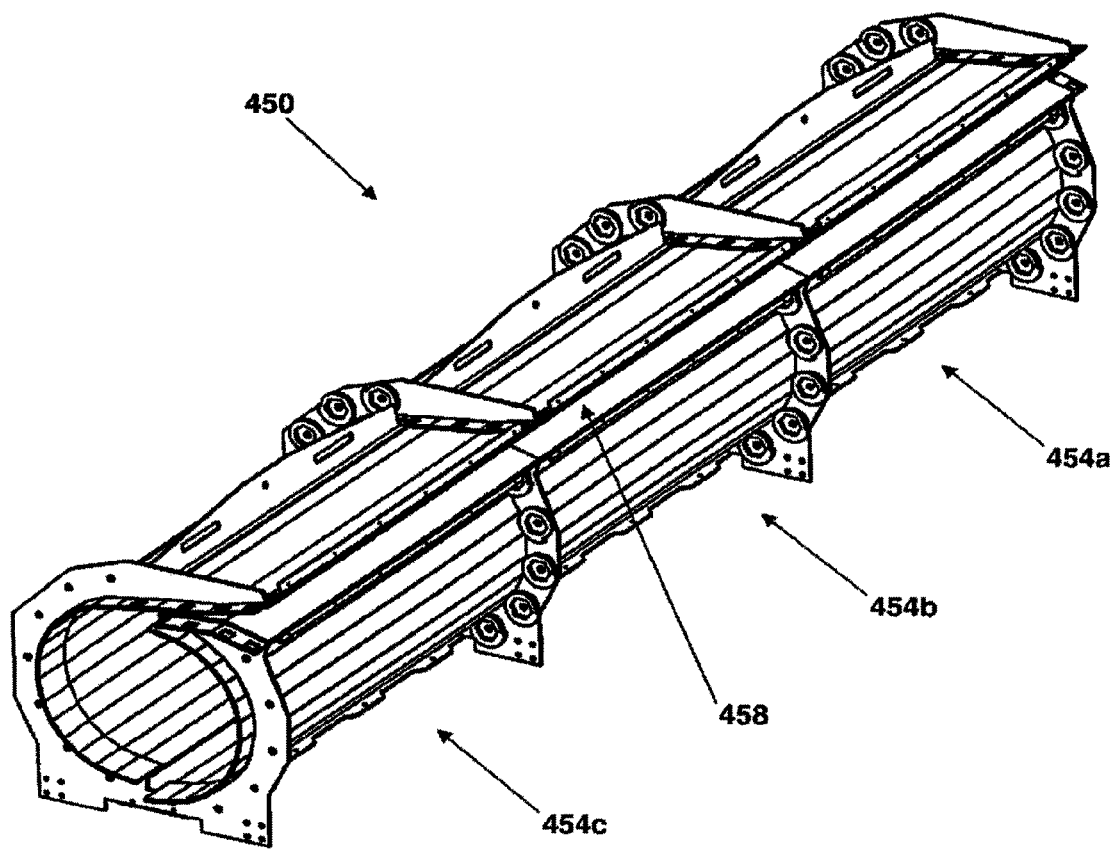
FIG. 10 shows a perspective view of a bullet trap of the present invention.

Turning now to FIG. 10, there is shown a perspective view of another bullet trap according to the present invention. The bullet trap, indicated generally at 450, includes an elongate containment chamber and also includes an opening 458 (later shown as formed by channel 474) for directing bullets into the containment chamber. It is appreciated that the opening 458 will typically be made larger by extending the channel (474, not shown) outwardly to a greater extent than is shown to provide a greater area into which bullets may be fired. For clarity in viewing the bullet trap 450, the full extent of the opening 458 is not shown, but is more fully discussed below.

The bullet trap 450 may include a plurality of bullet trap sections 454a, 454b, 454c. The bullet trap sections may be attached together so as to form an elongate bullet trap 450. It is thus appreciated that any number of modular bullet trap sections 454 could be used to create a bullet trap 450 of a desired width. One bullet trap section 454 may be used alone to create a short bullet trap, while many sections may be used to form longer continuous bullet traps.

A significant advantage of the bullet trap 450 is that a continuous bullet trap is presented to a shooter. The opening 458 by which bullets enter the bullet trap is continuous and uninterrupted by intervening sidewalls or supports which could cause ricochets. Additionally, there are no gaps as may be formed between single bullet traps which are placed adjacent each other to form a larger trap, as may occur with some prior art designs.

The detailed structures of the bullet trap of FIG. 10 will be discussed in reference to the following figures, which are close up views of the various structures of the bullet trap of FIG. 10. It is appreciated that the bullet trap shown in FIG. 10 contains all of the structures detailed in the subsequent figures, but not all structures of the bullet trap are visible in FIG. 10, and for clarity are not all numbered and discussed in FIG. 10. Similarly, not all structures are numbered and discussed in the following figures, as some figures are more suited to showing particular structures.

Figure 11:
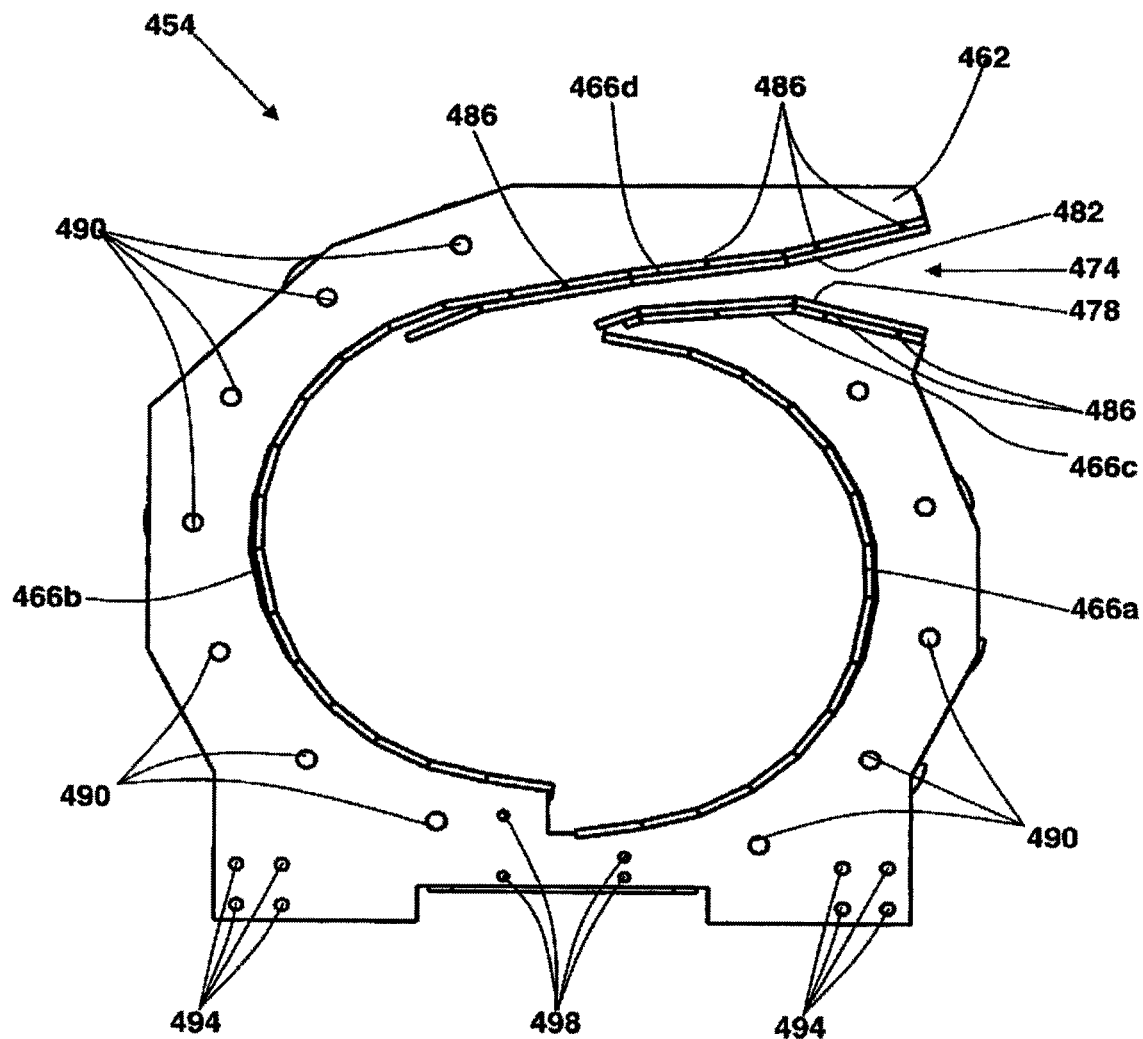
FIG. 11 shows an end view of the bullet trap of FIG. 10.

Turning now to FIG. 11, an end view of a bullet trap section of the bullet trap of FIG. 10 is shown. The bullet trap section 454 includes support frames 462 which are used to support other structures of the bullet trap. It is appreciated that the support frame 462 may be formed as a single piece or may be formed in multiple pieces, such as a front piece and a back piece. For an elongate bullet trap, a support frame 462 is used to form a joint between adjacent sections. The support frame 462 thus has a number of flanges 466a-466d attached thereto. The flanges 466a-466d are used to attach the ballistic plates which define the containment chamber 470 and the channel 474 into the containment chamber. The flanges may thus include a flange 466a used to support a front impact plate (not shown), a flange 466b used to support a rear impact plate (not shown), a flange 466c used to support a lower channel plate 478, and a flange 466d used to support an upper channel plate 482. The flanges 466a-466d may be continuous flanges formed to the shape of the channel and containment chamber to the extent possible, or may comprise many separate flanges as may be appropriate.

The flanges 466a-466d are used to hold the impact plates and channel plates 478, 482 to the support frame 462. According to a preferred embodiment, the flanges 466c, 466d used to support the channel plates 478, 482 have holes 486 formed therein, and the channel plates 478, 482 have fasteners attached to the back side thereof for securing the channel plates to the flanges. The fasteners may be threaded studs or nuts welded to the back side of the channel plates 478, 482, allowing the channel plates to be attached to the flanges 466c, 466d. Such an attachment arrangement provides a channel 474 into the bullet trap which is free of fasteners or other projections which may cause ricochets.

According to a preferred embodiment, the impact plates are attached to the outside of the flanges 466a, 466b such that the inside of these flanges forms part of the containment chamber. Clamps are used to hold the impact plates against the outside surface of the flanges 466a, 466b. Such an arrangement provides a containment chamber without projections obstructing the path of the bullet while providing a design which is secure and relatively easy to assemble and maintain.

A preferred method of attaching the impact plates to the flanges 466a, 466b is to attach clamps to the support frame 462 which hold the impact plates to the flanges. Thus, holes 490 may be formed in the support frame 462 and used to mount the clamps. The support frame 462 may also have holes 494 for mounting the bullet trap to a floor or stand, and holes 498 for attaching a bullet collection system.

Thus, the support frame 462 may be formed such that the support frame does not extend inwardly into the containment chamber, or does not significantly extend inwardly into the support chamber. Thus, in referring to the construction of the containment chamber, an intervening sidewall refers to an interior sidewall which separates the containment chamber (or inlet channel) into discrete sections, as prior art bullet traps have done. Thus, the present invention teaches how to form the containment chamber without intervening sidewalls as joints between sections. Additionally, the present invention teaches how to form the inlet channel into the containment chamber without intervening sidewalls between sections of the channel, significantly reducing the risk of ricochets. A bullet trap may thus be formed which contains no intervening sidewalls in the channel, which contains no interior sidewalls in the channel and that portion of the containment chamber directly exposed to bullets entering the channel, or which contains no interior sidewalls in the channel and in the entire containment chamber.

Figure 12:
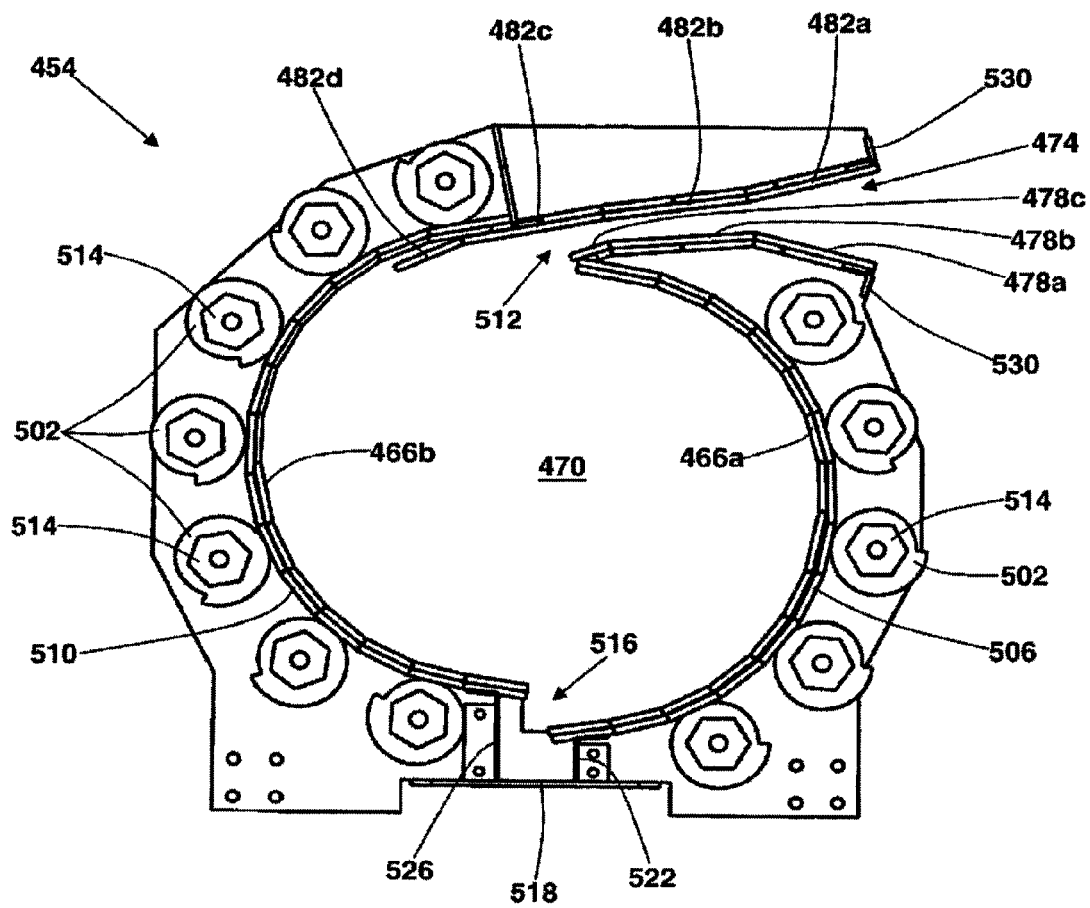
FIG. 12 shows another end view of the bullet trap of FIG. 10.

Turning now to FIG. 12, another end view of the bullet trap section of FIG. 11 is shown. The bullet trap section is shown without the near support frame 462. Thus, the impact plates, channel plates, etc. and far support frame 462 are shown. The support frame 462 is shown with a plurality of clamps 502 which are used to hold the front impact plate 506 to the flange 466a and to hold the rear impact plate 510 to the flange 466b. The clamps 502 may preferably be cams, allowing a user to clamp the impact plates 506, 510 to the flanges 466a, 466b by rotating the cams. Thus, the cams 502 may be formed with sockets 514 therein (or alternatively with protrusions thereon) which allow a tool to engage and rotate the cams. The cams 502 shown are formed with a spiral shaped edge of gradually increasing radius such that rotating the cam presses the impact plate against the support frame flange.

The cams 502 may be formed by cutting the cam shape and socket shape out of plate steel or another suitable material and welding this piece to a second piece of plate steel (or other suitable material) forming a back plate having a pivot hole drilled therein. Alternatively, the cams 502 may be formed from plate steel where the socket and cam portion are formed on different pieces of steel and then attached together. Additionally, the cams 502 may be cast or milled from solid material. There are thus many ways of forming the cams. It is desirable to form the cams 502 from pieces of plate steel because this allows the cams to be formed from scraps of material from this or other projects.

It is appreciated that where a support frame 462 is between two sections of the bullet trap (as shown in FIG. 10), clamps 502 will be attached to both sides of the support frame and flanges 466a-466d will extend outwardly on both sides of the support frame to allow for attachment of the impact plates 506, 510 and channel plates 478, 482 to both sides of the support frame. Additionally, cams 502 will typically be attached to both sides of the support frame 462.

The impact plates 506, 510 are shown in a generally semi-circular or curved shape, allowing the bullet to move in a generally circular manner within the containment chamber 470 until stopping. The impact plates 506, 510 may be smoothly curved, or may have a number of angular bends, as shown, to achieve the desired shape. Additionally, a single front impact plate 506 and rear impact plate 510 may be replaced with multiple front and rear impact plates. The impact plates must be configured to both contain and decelerate bullets. Typically, the front impact plate 506 is placed lower than the rear impact plate, creating an upper opening 512 in alignment with the channel 474 and a lower opening 516 through which decelerated bullets may exit the containment chamber 470.

The lower opening in the containment chamber 470 should be sufficiently enclosed to direct the bullets into a receptacle or transport mechanism and to prevent loss of bullets or bullet fragments. The bullet trap shown is formed with a bottom flange 518 which, along with a front wall 522 and back wall 526, allow for attachment of a bullet collection receptacle or transport mechanism and control the exiting of bullets from the bullet trap.

The channel 474 may be formed so as to control the entry of bullets into the containment chamber 470 and to control wear of the bullet trap. Bullets striking steel plates at high impact angles result in greater damage to the plate and bullet (generating lead particles) than bullets striking the plate at lower angles. It is therefore desirable to control the angle at which the bullets strike the various steel plates.

Thus, the lower channel plate 478 may have a first section 478a, a second section 478b, and a third section 478c. Similarly, the upper channel plate 482 may have a first section 482a, a second section 482b, a third section 482c, and even a fourth section 482d. A bullet which strikes the first section of the lower plate 478a will likely ricochet towards the second section of the upper plate 482b. A bullet which strikes the second section of the lower plate 478b will likely ricochet towards the third section of the upper plate 482c. Bullets striking the upper plate will likely ricochet towards the lower plate in a similar manner.

Thus, the upper channel plate 482 and lower channel plate 478 are bent into the various sections of the upper channel plate 482a-482c and lower channel plate 478a-478c so as to present decreasing angles of incidence to incoming bullets, controlling the angles at which the bullets may strike the channel plates and enter the containment chamber 470. The upper channel plate 482 may also have a rear section 482d which is bent downwardly as shown. The rear section 482d prevents bullets from striking the rear impact plate 510 without first striking at least the upper channel plate 482. It is appreciated that a bullet which first strikes the rear impact plate 510 would strike at a higher angle of incidence, causing more wear on the plate.

Bullets thus enter the containment chamber 470 through the channel 474 and strike the rear impact plate 510 at a shallow angle of incidence. The bullets continue to move in a circular manner, striking the front impact plate 506 and rear impact plate 510 until the bullet is slowed significantly or stopped. Gravity then moves the bullet to the bottom of the containment chamber and through the lower opening 516, where it may move into a containment receptacle or transport mechanism, preferably attached to the bullet trap via bottom flange 518.

The channel 474 is shown in this and the others of FIGS. 10-15 as a relatively small channel, providing a relatively small opening. The full extent of the channel 474 is not shown for clarity, but it is appreciated that a large opening and channel are desired to provide a larger opening into which bullets may be fired. It is appreciated that the channel 474 as shown does not provide a significant window into which people may fire bullets.

Thus, the bullet trap is typically formed with a larger channel 474. The lower channel plate 478 and upper channel plate 482 may be extended forwards, typically by extending the first section 478a of the lower channel plate 478 and the first section 482a of the upper channel plate 482. Additionally, additional steel plates which extend the channel 474 may be connected thereto so as to extend the channel 474 and thereby provide a larger shooting window. The lower channel plate 478 and upper channel plate 482 may thus have brackets 530 attached thereto, which may be used to attach steel plates to extend the channel. It is appreciated that it is always desirable to avoid projections which may be struck by bullets and cause ricochets. As such, attachment mechanisms like the brackets 430 are typically mounted to the back side of the plates whenever possible.

Figure 13:
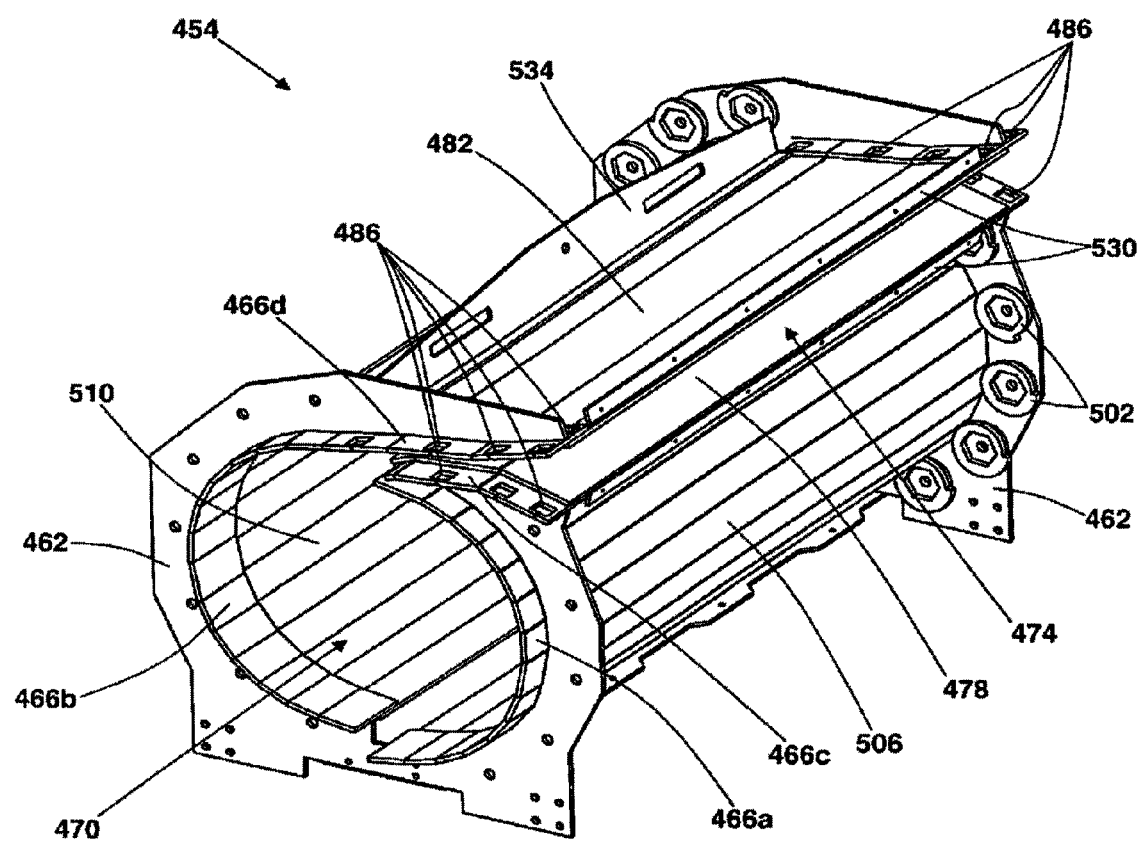
FIG. 13 shows a perspective view of a section of the bullet trap of FIG. 10.

Turning now to FIG. 13, a perspective view of a single bullet trap section of the bullet trap of FIG. 10 is shown. It can be more clearly seen how the flanges 466a, 466b may form a part of the containment chamber 470. It can also be seen more clearly how the impact plates 506, 510 are held against the flanges 466a, 466b with the clamps or cams 502. The assembly allows for a containment chamber 470 to extend through multiple bullet trap sections 454 without intervening sidewalls or support structures. That is to say that there is no need for support sidewalls or other structures that obstruct the containment chamber 470 or channel 474 or present needless ricochet dangers to a shooter.

FIG. 13 also shows the holes 486 which may be formed in the flanges 466c, 466d and used to attach the lower channel plate 478 and upper channel plate 482. A handle 534 may be attached to the upper channel plate 482. The handle 534 may be used to lift the upper channel plate into place when mounting the upper channel plate. Also, the handle 534 may be placed so as to be against the rear impact plate 510 and thus be used to close any space between the rear impact plate and the upper channel plate.

Figure 14:
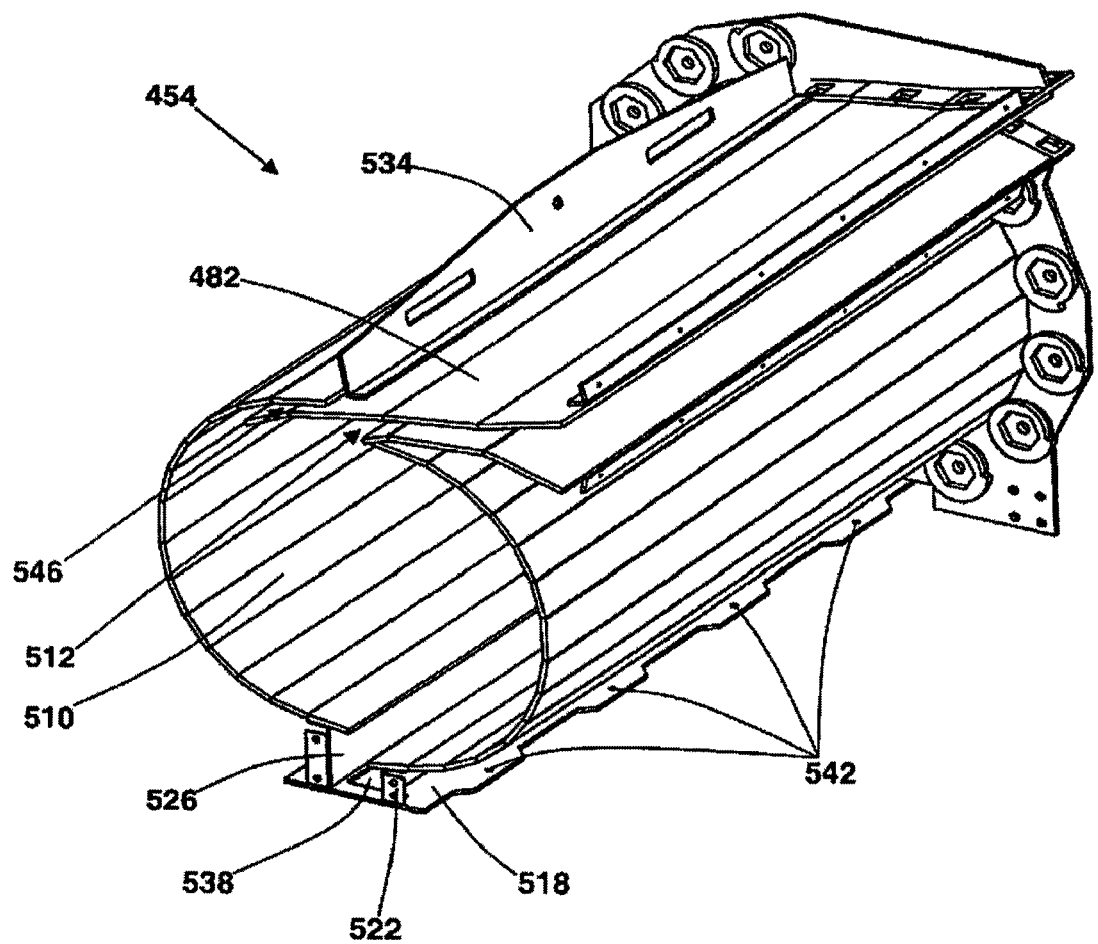
FIG. 14 shows another perspective view of a section of the bullet trap of FIG. 10.

Turning now to FIG. 14, another perspective view of the bullet trap section of FIG. 13 is shown. The bullet trap section is shown without a support plate 462 on the near side of the trap to allow for clearer viewing of the internal structures of the bullet trap. It can more clearly be seen how the bottom flange 518, front wall 522, and back wall 526 form an exit pathway from the containment chamber which does not allow bullets to exit in an undesired direction. The bottom flange 518 has an opening 538 formed therein through which the bullets exit. Additionally, the bottom flange is typically formed with holes 542 which may be used to attach a collection system to the bullet trap. The collection system may be a transportation system such as a screw auger, a funnel emptying into a bucket, or the like.

FIG. 14 also shows more clearly how a gap 546 may exist between the upper channel plate 482 and the rear impact plate 510. Such a gap 546 may be present when the channel plate 482 is placed on the inside of the flange 466d and the rear impact plate 510 is placed on the outside of the flange 466b. As such, the handle 534 may be formed to cover the gap 546 and prevent bullets or lead fragments from escaping through the gap, in addition to allowing for easier installation of the upper channel plate 482.

Figure 15:
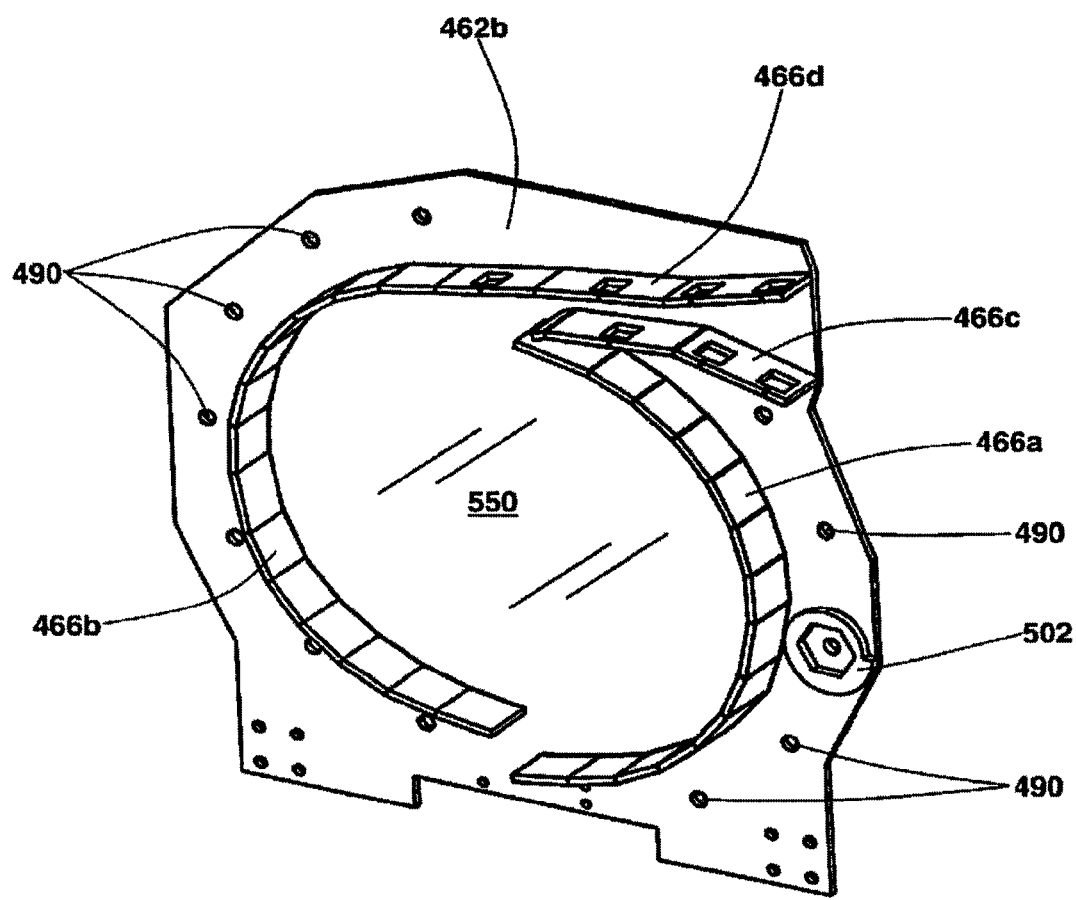
FIG. 15 shows a perspective view of a bullet trap support frame of the bullet trap of FIG. 10.

Turning now to FIG. 15, a perspective view of a support frame of the bullet trap of FIG. 10 is shown. It is appreciated that FIG. 10 shows a number of bullet trap sections 454 which are open on the ends thereof to allow for visibility in viewing the interior of the bullet trap 450. It is typically desirable to close the ends of the bullet trap to prevent bullets from escaping therefrom. FIG. 15 shows a terminal support frame 462b, while the previous figures, for visibility, show only central support frames 462 (those positioned between two bullet trap sections 454).

It is appreciated that a bullet trap will typically have two terminal support frames 462b, one on each side. Thus a left and a right handed terminal support frame 462b is necessary. If a bullet trap contains only one bullet trap section, both support frames will be terminal support frames. If a bullet trap contains two sections, it will include two terminal support frames 462b and one central support frame 462.

The terminal support frame 462b is attached to the impact plates and channel plates in the same manner as the central support frames as discussed above. Thus, the terminal support frame 462b has a number of flanges 466a-466d attached thereto, typically including a flange 466a used to support a front impact plate, a flange 466b used to support a rear impact plate, a flange 466c used to support a lower channel plate, and a flange 466d used to support an upper channel plate. For a terminal support frame 462b, the flanges 466a-466d are typically welded to the surface of the steel plate 550, and typically extend only to one side of the plate, although situations may exist where it is desirable to form two adjacent bullet traps which are separated into separate bullet traps. The terminal support frame 462b also includes holes 490 for attaching clamps 502, such as cams, and the other holes and structures discussed above and used to attach the plates, collection structures, etc. as discussed above.

Thus, there is disclosed an improved bullet trap. Those skilled in the art will appreciate numerous modifications which can be made without departing from the scope and spirit of the present invention. The appended claims are intended to cover such modifications.

What is claimed is:

1. A bullet trap comprising:
   a containment chamber comprising:
      an inlet for allowing bullets to enter the containment chamber;
      at least one impact plate configured for decelerating bullets;
      an outlet for allowing decelerated bullets to exit the containment chamber; and
      a plurality of supports configured for supporting the at least one impact plate, each of the plurality of supports comprising at least one impact plate flange; and
      at least one clamp for holding the at least one impact plate against the at least one impact plate flange to thereby attach the at least one impact plate to the plurality of supports; and
   wherein the at least one clamp is configured for holding the at least one impact plate against the at least one impact plate flange without penetrating through the impact plate.

2. The bullet trap of claim 1, further comprising a plurality of plates disposed generally opposite one another and extending toward one another as the plurality of plates extend toward the containment chamber to define a narrowing channel for directing bullets into the containment chamber.

3. The bullet trap of claim 2, wherein the channel is defined by an upper channel plate and a lower channel plate.

4. The bullet trap of claim 3, wherein each of the plurality of supports further comprises at least one channel plate flange for attaching the upper channel plate and lower channel plate to the support.

5. The bullet trap of claim 4, wherein the at least one channel plate flange is separate from the at least one impact plate flange.

6. The bullet trap of claim 4, wherein each of the plurality of supports comprises an upper channel plate flange for attaching the upper channel plate to the support and a lower channel plate flange for attaching the lower channel plate to the support.

7. The bullet trap of claim 3, wherein the upper channel plate comprises a first section disposed at a first angle relative to horizontal and a second section disposed at a second angle relative to horizontal.

8. The bullet trap of claim 7, wherein the upper channel plate further comprises a third section disposed at a third angle relative to horizontal.

9. The bullet trap of claim 8, wherein the upper channel plate further comprises a fourth section disposed at a fourth angle relative to horizontal.

10. The bullet trap of claim 3, wherein the lower channel plate comprises a first section disposed at a first angle relative to horizontal and a second section disposed at a second angle relative to horizontal.

11. The bullet trap of claim 10, wherein the lower channel plate further comprises a third section disposed at a third angle relative to horizontal.

12. The bullet trap of claim 3, wherein the upper channel plate further comprises a handle disposed thereon.

13. The bullet trap of claim 6, wherein the upper channel plate is attached to the bottom of the upper channel plate flange and the lower channel plate is attached to the top of the lower channel plate flange.

14. The bullet trap of claim 1, wherein each of the supports comprises a first impact plate flange and a second impact plate flange, and wherein the bullet trap comprises a first impact plate and a second impact plate.

15. The bullet trap of claim 1, wherein each of the plurality of supports comprises a support frame, and wherein the at least one impact plate flange is formed integrally with the support frame.

16. The bullet trap of claim 15, wherein the support frame, other than the impact plate flange, does not extend into the containment chamber.

17. The bullet trap of claim 15, further comprising a channel for directing bullets into the inlet, and wherein the support frame does not extend into the channel.

18. The bullet trap of claim 15, wherein the plurality of clamps are attached to the support frame.

19. The bullet trap of claim 1, wherein the at least one clamp comprises a plurality of clamps disposed along the plurality of supports to clamp the at least one impact plate against the at least one impact flange without penetrating therethrough.

20. The bullet trap of claim 1, wherein the at least one impact plate held by the at least one clamp comprises a plate that is generally arcuate.

21. The bullet trap of claim 20, wherein the at least one impact plate held by the at least one clamp comprises at least two generally arcuate plates.

22. The bullet trap of claim 1, wherein the containment chamber is configured to direct a projectile passing through the inlet in a generally circular path as the bullet decelerates.

23. A bullet trap comprising:
a containment chamber comprising:
   an inlet for allowing bullets to enter the containment chamber;
   at least one impact plate configured for decelerating bullets;
   an outlet for allowing decelerated bullets to exit the containment chamber; and
   a plurality of supports configured for supporting the at least one impact plate, each of the plurality of supports comprising at least one impact plate flange; and
   at least one clamp for holding the at least one impact plate against the at least one impact plate flange to thereby attach the at least one impact plate to the plurality of supports, wherein each of the supports comprises a first impact plate flange and a second impact plate flange, and wherein the bullet trap comprises a first impact plate and a second impact plate; and wherein the first impact plate is attached to the outside of the first impact plate flange and the second impact plate is attached to the-outside of the second impact plate flange such that the insides of the first impact plate flange and second impact plate flange define part of the containment chamber surface.

24. A bullet trap comprising:
a containment chamber comprising:
   an inlet for allowing bullets to enter the containment chamber;
   at least one impact plate configured for decelerating bullets;
   an outlet for allowing decelerated bullets to exit the containment chamber; and
   a plurality of supports configured for supporting the at least one impact plate, each of the plurality of supports comprising at least one impact plate flange; and
   at least one clamp for holding the at least one impact plate against the at least one impact plate flange to thereby attach the at least one impact plate to the plurality of supports, and
wherein the at least one clamp comprises a plurality of rotatable cams.

25. A bullet trap comprising:
a containment chamber comprising:
   an inlet for allowing bullets to enter the containment chamber;
   at least one impact plate configured for decelerating bullets;
   an outlet for allowing decelerated bullets to exit the containment chamber; and
   a plurality of supports configured for supporting the at least one impact plate, each of the plurality of supports comprising at least one impact plate flange; and
   at least one clamp for holding the at least one impact plate against the at least one impact plate flange to thereby attach the at least one impact plate to the plurality of supports;
wherein the plurality of supports each comprises a support frame; and
wherein the support frame does not substantially extend into the containment chamber, and wherein the impact plate flange does extend into the containment chamber.

26. A bullet trap comprising:
a first bullet trap section comprising at least one impact plate defining a containment chamber section configured for directing a bullet in a generally circular deceleration path;
a second bullet trap section comprising at least one impact plate defining a containment chamber section configured for directing a bullet in a generally circular deceleration path;
a first support disposed between the first bullet trap section and the second bullet trap section so as to join the first bullet trap section to the second bullet trap section so as to form a single elongate containment chamber, the first support comprising:
   a support frame, the support frame extending generally around the exterior of the containment chamber;
   at least one impact plate flange attached to the support frame; and
   at least one clamp for holding the at least one impact plates of the adjacent bullet trap sections against the at least one impact plate flange to thereby attach the at least one impact plate to the support frame.

27. The bullet trap of claim 26, wherein the support frame, other than the impact plate flange, does not extend into the containment chamber.

28. The bullet trap of claim 26, wherein the at least one impact plate flange is disposed in the containment chamber and forms a part of the containment chamber impact surface.

29. The bullet trap of claim 26, wherein the at least one impact plate of each of the bullet trap sections comprises a front impact plate and a rear impact plate, and wherein the impact plates are generally curved in shape to form a generally cylindrical containment chamber.

30. The bullet trap of claim 26, wherein the at least one clamp comprises a plurality of rotatable cams attached to the support frame and configured to hold the plurality of impact plates against the outside of the at least one impact plate flange.

31. The bullet trap of claim 30, wherein the inside surface of the impact plate flange forms part of the surface of the containment chamber.

32. The bullet trap of claim 26, further comprising a channel for directing bullets into the containment chamber.

33. The bullet trap of claim 32, wherein the channel comprises an upper channel plate and a lower channel plate the upper channel plate and the lower channel plate sloping toward one another so as to define a narrowing channel.

34. The bullet trap of claim 33, wherein the upper channel plate comprises a first section disposed at a first angle relative to horizontal and a second section disposed at a second angle relative to horizontal, and wherein the second angle is smaller than the first angle.

35. The bullet trap of claim 34, wherein the upper channel plate further comprises a third section disposed at a third angle relative to horizontal, and wherein the third angle is greater than the second angle.

36. The bullet trap of claim 33, wherein the lower channel plate comprises a first section disposed at a first angle relative to horizontal and a second section disposed at a second angle relative to horizontal, and wherein the second angle is less than the first angle.

37. A bullet trap comprising:
a first bullet trap section comprising at least one impact plate defining a containment chamber section;
a second bullet trap section comprising at least one impact plate defining a containment chamber section;
a first support disposed between the first bullet trap section and the second bullet trap section so as to join the first bullet trap section to the second bullet trap section so as to form a single elongate containment chamber, the first support comprising:
a support frame, the support frame extending generally around the exterior of the containment chamber;
at least one impact plate flange attached to the support frame;
at least one clamp for holding the at least one impact plate of the adjacent bullet trap sections against the at least one impact plate flange to thereby attach the at least one impact plate to the support frame; and
a channel for directing bullets into the containment chamber, wherein the channel comprises an uninterrupted inlet extending across the first bullet trap section and the second bullet trap section.

38. The bullet trap of claim 37, wherein the support frame does not extend into the containment chamber in the area of the containment chamber immediately adjacent the inlet.

39. The bullet trap of claim 37, wherein the support frame does not extend into the containment chamber to an extent greater than half of the diameter of the containment chamber.

40. The bullet trap of claim 37, wherein the support frame does not substantially extend into the containment chamber.

41. A bullet trap comprising:
at least one impact plate forming a first containment chamber section;
a first support disposed at a first end of the first containment chamber section, the first support having at least one flange thereon;
at least one rotatable cam configured for holding the at least one impact plate against the at least one flange of the first support;
a second support disposed at a second end of the first containment chamber section, the second support having at least one flange thereon; and
at least one rotatable cam configured for holding the at least one impact plate against the at least one flange of the second support.

42. The bullet trap of claim 41, wherein at least one flange of the first support and the at least one flange of the second support form part of the first containment chamber section.

43. The bullet trap of claim 41, wherein the first support comprises a support frame, and wherein the at least one flange and the at least one rotatable cam are attached to the support frame.

44. The bullet trap of claim 41, further comprising at least one impact plate forming a second containment chamber section, wherein a first end of the second containment chamber section is disposed adjacent the second edge of the first containment chamber section.

45. The bullet trap of claim 44, further comprising at least one rotatable cam for holding the at least one impact plate of the second containment chamber section against the at least one flange of the second support.

46. The bullet trap of claim 45, wherein the second support is open through a middle thereof so as to unify the first containment chamber section and second containment chamber section into a single containment chamber.

47. The bullet trap of claim 44, further comprising a third support disposed at a second end of the second containment chamber section, the third support comprising at least one flange, and further comprising at least one rotatable cam configured for holding the at least one impact plate of the second containment chamber against the at least one flange of the third support.

48. The bullet trap of claim 44, further comprising a continuous inlet configured for allowing bullets to enter the first containment chamber section and the second containment chamber section.

49. The bullet trap of claim 44, further comprising at least one additional containment chamber section disposed between the first containment chamber section and the second containment chamber section and connecting the first containment chamber section and second containment chamber section into a continuous elongate containment chamber.

50. A bullet trap comprising:
a first bullet trap section having a first end and a second end, the first bullet trap section comprising a plurality of impact plates configured to form a bullet containment chamber section;
a second bullet trap section having a first end and a second end, the second bullet trap section comprising a plurality of impact plates configured to form a containment chamber section, wherein the first end of the second bullet trap section is connected to the second end of the first bullet trap section;

a first terminal support attached to the first end of the first bullet trap section, the terminal support comprising:
   a support frame, the support frame extending so as to close an end of the containment chamber adjacent the first end of the first bullet trap section;
   at least one impact plate flange attached to the support frame; and
   a plurality of clamps for holding the plurality of impact plates of the first bullet trap section against the at least one impact plate flange to thereby attach the plurality of impact plates to the support frame;

a second terminal support attached to the second end of the second bullet trap section, the terminal support comprising:
   a support frame, the support frame extending so as to close an end of the containment chamber adjacent the second end of the second bullet trap section;
   at least one impact plate flange attached to the support frame; and
   a plurality of clamps for holding the plurality of impact plates of the second bullet trap section against the at least one impact plate flange to thereby attach the plurality of impact plates to the support frame; and wherein the plurality of clamps push the impact plates against an outside surface of the impact plate flanges such that an inside surface of the impact plate flanges define part of the containment chamber impact surface.

51. The bullet trap of claim 50, further comprising a first central support disposed between the second end of the first bullet trap section and the first end of the second bullet trap section, the central support comprising:
   a support frame;
   at least one impact plate flange attached to the support frame; and
   a plurality of clamps for holding the plurality of impact plates of the adjacent bullet trap section against the at least one impact plate flange to thereby attach the plurality of impact plates to the support frame.

52. The bullet trap of claim 51, wherein the support frame of the central support extends around the exterior of the containment chamber.

53. The bullet trap of claim 51, wherein the support frame of the central support does not extend into the containment chamber beyond the at least one impact plate flange.

54. The bullet trap of claim 50, wherein the plurality of clamps are attached to the support frame and push the impact plates against the impact plate flanges.

55. The bullet trap of claim 54, wherein the plurality of clamps comprise a plurality of cams.

56. The bullet trap of claim 50, wherein the plurality of impact plates of each bullet trap section comprises a front impact plate and a rear impact plate configured so as to form a generally cylindrical containment chamber when the plurality of impact plates are clamped against the impact plate flange.

57. The bullet trap of claim 50, further comprising a channel for directing bullets into the containment chamber.

58. The bullet trap of claim 57, wherein the channel comprises an upper channel plate and a lower channel plate.

59. The bullet trap of claim 58, wherein at least one of the upper channel plate and lower channel plate comprises a plurality of channel plate sections disposed at different angles relative to horizontal.

60. A bullet trap comprising:
   a containment chamber comprising:
      an inlet for allowing bullets to enter the containment chamber;
      at least one impact plate configured for decelerating bullets;
      an outlet for allowing decelerated bullets to exit the containment chamber; and
      a plurality of supports configured for supporting the at least one impact plate, each of the plurality of supports comprising at least one impact plate flange; and
      at least one clamp for holding the at least one impact plate against the at least one impact plate flange to thereby attach the at least one impact plate to the plurality of supports; and
   wherein the at least one impact plate comprises an impact plate held by the at least one clamp, the impact plate having a plurality of bends formed therein.

61. A bullet trap comprising:
   a bullet containment chamber, the containment chamber comprising an inlet, a plurality of plates disposed to direct a projectile in a generally circular path while it decelerates, and an outlet;
   a support having at least one flange, extending outwardly therefrom in a generally arcuate pattern; and
   a plurality of clamps for holding the plurality of plates to the to the at least one flange.

62. The bullet trap of claim 61, wherein the at least one flange comprises a first, generally arcuate flange and a second, generally arcuate flange, and a void defined between the first generally arcuate flange and the second generally arcuate flange.

* * * * *

UNITED STATES PATENT AND TRADEMARK OFFICE
CERTIFICATE OF CORRECTION

PATENT NO. : 7,793,937 B2  Page 1 of 1
APPLICATION NO. : 12/250388
DATED : September 14, 2010
INVENTOR(S) : Kyle Bateman, Thomas Marshall and David Bassett It is certified that error appears in the above-identified patent and that said Letters Patent is hereby corrected as shown below:

Cover page, Item [57] Abstract, line 3, it reads "risk or ricochet..." should read --risk of richochet...--

In the drawings, Sheet 6 of 19, FIG. 5, the reference numeral "132" applied to the second impact surface should read --132a-- (see text of specification for further detail, column 9, lines 37-40).

Column 6, line 7, it reads "...deflected into in a" should read --...deflected into a--

Column 6, line 9, it reads "...angle of incidence, than..." should read --...angle of incidence than...--

Column 10, line 26, it reads "....a belt conveyer..." should read --...a belt conveyor...--

Column 11, line 16, it reads "support beam 214." should read --support beam 224.--

Column 11, line 44, it reads "...bolting attachment can" should read --...bolting attachments can--

Column 11, line 46, it reads "Turning now to FIG. 7B..." should read --Turning now to FIG. 7A...--

Signed and Sealed this

Twenty-first Day of December, 2010

David J. Kappos
*Director of the United States Patent and Trademark Office*